(12) United States Patent
Isobe et al.

(10) Patent No.: US 8,434,947 B2
(45) Date of Patent: May 7, 2013

(54) SENSOR-EQUIPPED BEARING FOR WHEEL

(75) Inventors: Hiroshi Isobe, Iwata (JP); Toru Takahashi, Iwata (JP); Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 585 days.

(21) Appl. No.: 12/452,909

(22) PCT Filed: Jul. 29, 2008

(86) PCT No.: PCT/JP2008/002013
§ 371 (c)(1),
(2), (4) Date: Jan. 28, 2010

(87) PCT Pub. No.: WO2009/016820
PCT Pub. Date: Feb. 5, 2009

(65) Prior Publication Data
US 2010/0129017 A1 May 27, 2010

(30) Foreign Application Priority Data

Jul. 31, 2007 (JP) .................. 2007-199216
Jul. 31, 2007 (JP) .................. 2007-199217
Jul. 31, 2007 (JP) .................. 2007-199219
Jul. 31, 2007 (JP) .................. 2007-199220

(51) Int. Cl.
*F16C 32/00* (2006.01)
*F16C 41/04* (2006.01)
*G01L 3/14* (2006.01)

(52) U.S. Cl.
USPC .................. 384/448; 73/862.322

(58) Field of Classification Search ........... 384/448, 384/544, 589; 73/862.322
See application file for complete search history.

(56) References Cited

U.S. PATENT DOCUMENTS

| 4,341,122 A | 7/1982 | Lechler et al. |
| 6,535,135 B1 | 3/2003 | French et al. |
| 6,634,208 B2 | 10/2003 | Salou et al. |

(Continued)

FOREIGN PATENT DOCUMENTS

| EP | 1593948 | 11/2005 |
| JP | 55-132926 A | 10/1980 |

(Continued)

OTHER PUBLICATIONS

English Translation of the International Preliminary Report on Patentability mailed Mar. 4, 2010 and issued in corresponding International Patent Application PCT/JP2008/002013.

(Continued)

*Primary Examiner* — James Pilkington

(57) ABSTRACT

A sensor-equipped wheel support bearing assembly, in which a load imposed on the wheel can be accurately detected without influences from hysteresis is provided. This wheel support bearing assembly includes an outer member having a plurality of rolling surfaces, an inner member having rolling surfaces opposed respectively to the rolling surfaces of the outer member, and rolling elements between the rolling surfaces. A sensor unit is provided in a stationary member of one of the outer and inner members, which unit includes a strain generating member having two contact fixing segments to be fixed to the stationary member and a sensor fitted to the strain generating member for detecting a strain induced in this strain generating member. The two contact fixing segments are arranged at respective positions held at the same phase in a direction circumferentially of the stationary member.

12 Claims, 23 Drawing Sheets

U.S. PATENT DOCUMENTS

| | | | |
|---|---|---|---|
| 6,920,801 | B2 | 7/2005 | Van Leeuwen et al. |
| 6,971,799 | B2 | 12/2005 | Sato et al. |
| 7,178,413 | B2 | 2/2007 | Hofmann et al. |
| 7,249,528 | B2 | 7/2007 | Inoue |
| 7,604,413 | B2 | 10/2009 | Koike et al. |
| 7,628,540 | B2 | 12/2009 | Iwamoto et al. |
| 7,631,553 | B2 | 12/2009 | Heim |
| 7,661,320 | B2 | 2/2010 | Duret et al. |
| 7,762,128 | B2 | 7/2010 | Ozaki |
| 8,123,411 | B2 | 2/2012 | Norimatsu et al. |
| 8,167,497 | B2 * | 5/2012 | Ozaki et al. ............... 384/448 |
| 2002/0012484 | A1 | 1/2002 | Salou et al. |
| 2002/0061148 | A1 | 5/2002 | Salou et al. |
| 2002/0097040 | A1 | 7/2002 | Takizawa et al. |
| 2003/0218548 | A1 | 11/2003 | Sato et al. |
| 2004/0031311 | A1 | 2/2004 | Meyer et al. |
| 2005/0016296 | A1 | 1/2005 | Inoue |
| 2007/0157742 | A1 | 7/2007 | Kouduki et al. |
| 2009/0038414 | A1 | 2/2009 | Ozaki et al. |
| 2009/0044633 | A1 | 2/2009 | Duret et al. |
| 2009/0080822 | A1 | 3/2009 | Ozaki et al. |
| 2009/0097791 | A1 * | 4/2009 | Ozaki et al. ............... 384/448 |
| 2009/0129712 | A1 | 5/2009 | Ozaki et al. |
| 2009/0199660 | A1 | 8/2009 | Ozaki et al. |
| 2009/0229379 | A1 | 9/2009 | Ozaki et al. |
| 2009/0301222 | A1 | 12/2009 | Takahashi et al. |
| 2009/0324152 | A1 | 12/2009 | Ozaki et al. |
| 2010/0046871 | A1 | 2/2010 | Norimatsu |
| 2010/0135604 | A1 | 6/2010 | Ozaki et al. |

FOREIGN PATENT DOCUMENTS

| | | | |
|---|---|---|---|
| JP | 55-156608 | | 12/1980 |
| JP | 59-163531 | A | 9/1984 |
| JP | 63-256832 | A | 10/1988 |
| JP | 6-32735 | | 4/1994 |
| JP | 9-61268 | | 3/1997 |
| JP | 2002-098138 | | 4/2002 |
| JP | 2002-340922 | | 11/2002 |
| JP | 2003-166888 | A | 6/2003 |
| JP | 2003-172347 | | 6/2003 |
| JP | 2003-530565 | | 10/2003 |
| JP | 2003-336653 | | 11/2003 |
| JP | 2004-3601 | | 1/2004 |
| JP | 2004-142577 | | 5/2004 |
| JP | 2004-183684 | | 7/2004 |
| JP | 2005-502892 | A | 1/2005 |
| JP | 2005-37298 | A | 2/2005 |
| JP | 2005-77236 | | 3/2005 |
| JP | 2006-077807 | | 3/2006 |
| JP | 2007-057258 | | 3/2007 |
| JP | 2007-057259 | | 3/2007 |
| JP | 2007-057300 | | 3/2007 |
| JP | 2007-57302 | | 3/2007 |
| JP | 2007-71280 | | 3/2007 |
| JP | 2007-078615 | | 3/2007 |
| JP | 2007-155079 | | 6/2007 |
| JP | 2007-155629 | | 6/2007 |
| JP | 2007292158 | * | 11/2007 |
| WO | 01/77634 | A2 | 10/2001 |
| WO | 2007/054639 | A1 | 5/2007 |
| WO | WO2007/105367 | * | 9/2007 |
| WO | 2009/016829 | | 2/2009 |

OTHER PUBLICATIONS

Chinese Office Action issued Mar. 24, 2011 in a corresponding Chinese Patent Application 200880101293.5.
Japanese Office Action issued May 17, 2011 in a related Japanese Patent Application 2005-250576.
U.S. Appl. No. 11/990,071, filed Feb. 6, 2008, Takayoshi Ozaki, NTN Corporation.
U.S. Appl. No. 12/452,908, filed Jan. 28, 2010, Hiroshi Isobe, NTN Corporation.
Japanese Notification of Reason(s) for Rejection issued Aug. 23, 2011 in related Japanese Patent Application 2005-229211.
Notification of Reason(s) for Rejection issued Jun. 7, 2011 in related Japanese Patent Application 2005-240908.
Notification of Reason(s) for Rejection issued Jun. 7, 2011 in related Japanese Patent Application 2005-240909.
U.S. Office Action mailed May 25, 2011 in possible related U.S. Appl. No. 11/990,071.
U.S. Office Action issued Oct. 18, 2011 in related U.S. Appl. No. 11/990,071.
European Search Report dated Feb. 24, 2012 issued in related European Patent Application No. 08790294.6.
Japanese Office Action issued Dec. 20, 2011 in related Japanese Patent Application No. 2005-229211.
Chinese Office Action issued Jun. 14, 2011 in related Chinese Patent Application 200680028967.4.
Chinese Office Action mailed Mar. 14, 2012 issued in related Chinese Patent Application No. 200680028967.4.
U.S. Notice of Allowance mailed Jan. 5, 2012 issued in related U.S. Appl. No. 11/990,071.
International Search Report for PCT/JP2008/002013, mailed on Oct. 28, 2008.
U.S. Office Action issued Aug. 10, 2012 in related U.S. Appl. No. 12/452,908.
Japanese Office Action mailed Jun. 12, 2012 issued in corresponding Japanese Patent Application No. 2007-199217.
Japanese Office Action mailed Jun. 12, 2012 issued in corresponding Japanese Patent Application No. 2007-199216.
Extended European Search Report dated Jul. 30, 2012 issued in corresponding European Patent Application No. 08790277.1.
U.S. Office Action issued in related U.S. Appl. No. 12/452,908 mailed Nov. 16, 2012.

* cited by examiner

OUTBOARD SIDE ←→ INBOARD SIDE

OUTBOARD SIDE ⟷ INBOARD SIDE

← OUTBOARD SIDE    INBOARD SIDE →

SENSOR-EQUIPPED BEARING FOR WHEEL

CROSS REFERENCE TO RELATED APPLICATIONS

This application claims the benefit under 35 U.S.C. Section 371, of PCT International Application No. PCT/JP2008/002013, filed Jul. 29, 2008, which claimed is based priority to Japanese patent applications No. 2007-199216, No. 2007-199217, No. 2007-199219 and No. 2007-199220, all filed Jul. 31, 2007, the entire disclosures of which are herein incorporated by reference as a part of this application.

BACKGROUND OF THE INVENTION

1. Field of the Invention

The present invention relates to a sensor-equipped wheel support bearing assembly having a load sensor built therein for detecting a load imposed on a bearing unit of a vehicle wheel.

2. Description of the Related Art

As a technique for detecting a load imposed on each of vehicle wheels employed in an automotive vehicle, a sensor-equipped wheel support bearing assembly has been suggested, with which the load is detected by detecting a strain occurring in an outer diametric surface of an outer ring flange of a wheel support bearing assembly. (See, for example, the Patent Document 1 listed below.) A wheel support bearing assembly has also been suggested, in which a strain amplifying mechanism including an L-shaped member is fitted to an outer diametric portion and a flange portion of a stationary ring with a strain gauge applied to a portion of the strain amplifying mechanism. (See, for example, the Patent Document 2 listed below.)

[Patent Document 1] JP Laid-open Patent Publication No. 2002-098138

[Patent Document 2] JP Laid-open Patent Publication No. 2006-077807

SUMMARY OF THE INVENTION

According to the technique disclosed in the Patent Document 1 listed above, the strain occurring as a result of deformation of the flange portion of the stationary ring is detected. A problem has, however, been found that since the deformation of the stationary ring is accompanied by slippage between a flange surface and a knuckle surface in the event that a force of a magnitude exceeding a stationary frictional force acts, a hysteresis tends to occur in an output signal when load is applied repeatedly.

For example, in the even that a load acting on the wheel support bearing assembly in a certain direction increases, no slippage occurs between the stationary ring flange surface and the knuckle surface since at first the stationary frictional force is higher than the load, but the slippage occur when the load increases enough to overcome the stationary frictional force. If under this condition the load is decreased, no slippage occurs at first due to the stationary frictional force, but the slippage starts when it becomes of a certain magnitude. As a result, if an attempt is made to calculate the load at a portion where the deformation takes place, such a hysteresis as shown in FIG. 27 occurs in the output signal.

Also, even in the technique disclosed in the Patent Document 2 listed above, a portion of the strain amplifying mechanism comprised of the L-shaped member, which is fixed to the flange surface, tends to be affected by a slippage occurring between the flange surface and the knuckle surface and, therefore, a problem similar to that discussed previously occurs.

Additionally, in the case of detecting a vertical load Fz acting on the wheel support bearing assembly, amount of deformation of the stationary member is small relative to the load Fz, resulting in small amount of the strain. Accordingly, a sufficient detection sensitivity is not obtained with the technique discussed above and therefore the load Fz can not be detected accurately.

An object of the present invention is to provide a sensor-equipped wheel support bearing assembly, in which the load imposed on the vehicle wheel can be accurately detected without being affected by influences brought about by the hysteresis and the sensor can be used for a prolonged period of time.

The sensor-equipped wheel support bearing assembly of the present invention is a wheel support bearing assembly of a kind including an outer member having an inner periphery formed with a plurality of rows of rolling surfaces; an inner member having an outer periphery formed with rolling surfaces opposed respectively to the rolling surfaces; a plurality of rows of rolling elements interposed between the opposed rolling surfaces in those members; and a sensor unit, provided on an outer diametric surface of one of the outer member and the inner member that serves as the stationary member, including a strain generating member having two contact fixing segments secured to the outer diametric surface of the stationary member in contact therewith, and a sensor fitted to the strain generating member for detecting a strain occurring in the strain generating member, in which the two contact fixing segments in the sensor unit are arranged at the same phase relative to each other in a direction circumferentially of the stationary member.

When a load acts between a tire of the vehicle wheel and a road surface, the load is also applied to the stationary member (for example, the outer member) of the wheel support bearing assembly, resulting in deformation. The amount of deformation induced in the outer member as a result of application of the load varies depending on the position in the axial direction, but since in this instance the two contact fixing segments of the strain generating member in the sensor unit are fixed at the same phase in the circumferential direction with respect to the outer diametric surface of the outer member, the strain is easy to concentrate on the strain generating member and the detecting sensitivity increases correspondingly. Also, since the sensor unit is not fixed to a projection of the vehicle body fitting flange, which is a major cause of the hysteresis, the hysteresis occurring in an output signal of the sensor comes to be so small as to enable the load to be detected accurately. Accordingly, without being affected by influences brought about the hysteresis, the load imposed on the vehicle wheel can be detected accurately.

In the present invention, one of the two contact fixing segments is preferably arranged at an axial position that corresponds to a circumference of the outboard rolling surface of the plural rolling surfaces and the other of the two contact fixing segments is preferably arranged on an outboard side further away from such one of the contact fixing segments.

Where one of the contact fixing segments of the strain generating member in the sensor unit is fixed at the axial position which forms the circumference of the outboard row of the rolling surfaces in the outer diametric surface of the outer member, because the axial position is the site at which the load acting on a tire tread is transmitted from the inner member through the rolling elements, it is the site at which the amount of deformation is relatively large. On the other hand, the other of the two contact fixing segments of the strain generating member is fixed at the axial position on the outboard side further away from such one of the two contact fixing segments and, therefore, this axial position represents the site at which the amount of deformation is small as compared with at the first mentioned axial position. As a result, the strain occurring in the outer diametric surface of the outer member is transmitted to the strain generating member having been amplified and the amplified strain is then detected by the sensor.

In the present invention, the strain generating member in the sensor unit referred to above may have a cutout portion, in which case the sensor is provided in the vicinity of this cutout portion. In the case of this construction, the strain amplified and transmitted from the stationary member to the strain generating member comes to be easily concentrated on the cutout portion and, accordingly, the sensitivity of detection with the sensor can be increased and the load can be detected further accurately.

In the present invention, the strain generating member may be such that a surface portion positioned on a radially outer side of the contact fixing segment that is positioned on an outboard side relative to the cutout portion is configured to have a shape effective to avoid interference with hub bolts. Since the strain generating member is designed to have the surface portion positioned on that bearing outer diameter side of the outboard contact fixing segment relative to the cutout portion, which surface is so configured as to have a shape effective to avoid interference with the hub bolts, the contact fixing segments in the sensor unit will not interfere with the hub bolts and, hence, either a detection failure or damage to the sensor unit can be avoided, resulting in increase of the safety factor and, also, in increase of the period of use of the sensor.

In the present invention, an outboard corner of the surface portion of the strain generating member, which is positioned on the radially outer side of the contact fixing segment that is positioned on the outboard side relative to the cutout portion, may be chamfered to provide a chamfered corner of a shape effective to avoid interference with the hub bolts. Where the outboard corner is so chamfered as described above, that surface portion of the contact fixing segment can be formed with a simple processing to a shape effective to avoid interference with the hub bolts.

In the present invention, the surface portion of the strain generating member, which is positioned on the radially outer side of the contact fixing segment that is positioned on the outboard side relative to the cutout portion, may have a height protruding from the outer diametric surface of the outer member, which is smaller than a height of the contact fixing segment on an inboard side relative to the cutout portion, protruding from the outer diametric surface of the outer member, so that that surface portion may have a shape effective to avoid interference with the hub bolts. While described above the height of the surface portion of the outboard contact fixing segment, which is positioned on the bearing outer diameter side, is chosen to be small, interference with the hub bolts can be avoided without the strain generating member in its entirety being reduced in height.

In the present invention, the cutout portion in the sensor unit may be arranged on the outboard side and remote from a middle portion between the two contact fixing segments. Since the cutout portion is arranged on the outboard side and remote from the intermediate position between the two contact fixing segments of the strain generating member, the distance between the contact fixing segment, fixed at the axial position where the amount of deformation is large, and the cutout portion is so large that deformation occurs around the cutout portion as a result of the moment acting thereon with the strain consequently centered around the cutout portion, resulting in a further increase of the detecting sensitivity.

In the present invention, the cutout portion in the sensor unit may be cut out from an outer surface side of the strain generating member towards an inner surface side thereof. In the case of this construction, since one of the contact fixing segment is fixed at the axial position in the vicinity of the outboard rolling surface, in which the amount of deformation of the outer diametric surface of the outer member is relatively large, while the other of the contact fixing segment is fixed at the axial position further on the outboard side in which the amount of deformation is relatively small, a peripheral portion of the cutout portion is pulled by the deformation of the outer diametric surface of the outer member and the strain around the cutout portion comes to be considerable enough to calculate the load with high sensitivity.

The cutout portion in the sensor unit referred to above may be cut out from opposite side surfaces, which are perpendicular to each other in the widthwise direction relative to a direction of arrangement of the two contact fixing segments of the strain generating member, in a direction widthwise thereof. In the case of this construction, the strain does not disperse and is easily centered on a portion and, therefore, the load can be calculated with a further high sensitivity.

The cutout portion in the sensor unit may have a widthwise dimension so chosen as to be 2 mm or smaller. While the strain will disperse if the width of the cutout portion is large, selection of the widthwise dimension of the cutout portion to be 2 mm or smaller is effective to avoid dispersion of the strain allowing it to be centered on a portion and, therefore, the load can be calculated with a higher sensitivity.

In the present invention, the entire surface of a predetermined surface portion including a sensor installing surface in the strain generating member may be a flat plane. In the case of this construction, processing of the sensor unit and installation of the sensor can be facilitated.

In the present invention, while the entire surface of a predetermined surface portion that contains a sensor installing surface in the strain generating member is rendered to be a flat plane, the strain generating member may be fixed to the outer diametric surface of the stationary member through spacers. At a portion of an inner side surface of the strain generating member other than the remaining portion thereof where the spacer intervene, a gap tends to be formed between it and the outer diametric surface of the stationary member and the sensor can also be easily installed in the vicinity of the cutout portion without being interfered with the outer diametric surface of the stationary member.

In the present invention, the sensor may be provided in the proximity of the cutout portion in the strain generating member and, while the entire surface of a predetermined surface portion including a sensor installing surface in the strain generating member is rendered to be a flat plane, grooves may be provided between fixing positions of the two contact fixing segments of the sensor unit in the outer diametric surface of the stationary member. Where the grooves are provided in the outer diametric surface of the stationary member as hereinabove described, and where the flat plane of the strain generating member is an inner side surface opposed to the outer diametric surface of the stationary member, the gap tends to be formed between the outer diametric surface of the stationary member and the inner side surface, which is represented by the flat plane of the strain generating member, and, therefore, the sensor can also be easily installed at a location proximate to the cutout portion without being interfered with the outer diametric surface of the stationary member.

In the present invention, a vehicle body fitting flange, which is adapted to be coupled to a knuckle, may be provided on an outer periphery of the stationary member, bolt holes may be provided in this vehicle body fitting flange at a plurality of locations circumferentially thereof, circumferential portions of the flange, where the bolt holes are provided, may be rendered to be projecting segments protruding radially beyond the remaining portion thereof, and the sensor unit may be arranged at a middle portion between the neighboring projecting segments. In the case of this construction, the sensor can be installed at a location remote from the projecting segments, which form a cause of hysteresis, and, therefore, the hysteresis of the output signal of the sensor can be further reduced, allowing the load to be further accurately detected.

In the present invention, the stationary member may have a portion thereof provided with a thick walled portion that is locally thick in wall. When the load acts between the tire of the vehicle wheel and the road surface, the load is also applied to the stationary member (for example, the outer member) of the wheel support bearing assembly accompanied by deformation. Accordingly, if an attempt is made to calculate the load from the deformation of the vehicle body fitting flange while the sensor unit is fixed to, for example, the vehicle body fitting flange, hysteresis occurs in the output signal. Particularly where an attempt is made to detect through the strain generating member of the sensor unit, the strain of the stationary that is amplified, a considerable influence is brought about by the hysteresis on the output signal. However, the provision of the thick walled portion in that portion of the stationary member make it possible for the thick walled portion to have an increased rigidity with the amount of deformation reduced and, therefore, to provide a location where the influence brought about by the hysteresis is small. Formation of this thick walled portion makes it possible to provide a location, where the amount of deformation is small and the influence brought about by the hysteresis is small, at a location different from the vehicle body fitting flange. In view of this, when the sensor unit is to be fixed to the stationary member, one of the contact fixing segments of the strain generating member is fixed to a location proximate to, for example, the thick walled portion and the other of the contact fixing segments is fixed to a location proximate to, for example, the rolling surface in the stationary member, where the amount of deformation is relatively large. By so doing, the strain occurring in the stationary member is transmitted to the strain generating member in the form as amplified and this amplified strain can be detected by the sensor. For this reason, a working force developed between the tire of the vehicle wheel and the road surface can be detected with high sensitivity and, also, the hysteresis occurring in the output signal of the senor comes to be minimized. As a result, without being affected by the hysteresis, the load imposed on the vehicle wheel can be detected accurately.

In the present invention, the stationary member may be the outer member and the thick walled portion referred to above may be provided in a portion of the outer periphery of the stationary member in an outboard end portion thereof. Where the stationary member is the outer member, as compared with the case where the stationary member is assumed by the inner member, not only can the strain be detected with high sensitivity, but also an effect of reducing the hysteresis, which results from the formation of the thick walled portion, can be obtained easily. Also, the provision of the thick walled portion in that portion of the outer periphery adjacent the outboard end permits it to be provided at a location remote from the vehicle body fitting flange that is susceptible to influence brought about by a slippage if it exceeds the stationary frictional force. For this reason, the hysteresis of the output signal of the sensor is further reduced, allowing the load to be detected with further accuracy. Also, if the stationary member is the outer member, a relatively large space is available in the outer periphery adjacent the outboard side and, therefore, the thick walled portion can be easily provided there.

In the present invention, a calculator may be provided for calculating the load acting on the wheel support bearing assembly in reference to at least one of the absolute value of the output signal of the sensor, the average value of the output signal and the amplitude of the output signal. In the instance under discussion, the calculator calculates the working force between the tire and the road surface or an external force acting on the wheel support bearing assembly in reference to at least one of the absolute value of the output signal of the sensor, the average value of the output signal and the amplitude of the output signal.

During rotation of the wheel support bearing assembly, it may occur that a cyclic change may occur in amplitude of the output signal of the sensor in the sensor unit depending on the presence or absence of the rolling elements moving on the rolling surface in the vicinity of the sensor unit. Accordingly, by calculating the cycle of the amplitude of a detection signal, it is possible to detect the speed at which the rolling elements pass, that is, the number of revolutions of the vehicle wheel. Where any change occurs in the output signal in this way, the load can be calculated in reference to the average value or the amplitude of the output signal. In the absence of any change, the load can be calculated in reference to the absolute value.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will now be described in detail with particular reference to FIGS. 1 to 3. This embodiment is directed to a inner ring rotating type wheel support bearing assembly of a third generation model, which is used to rotatably support a vehicle drive wheel. It is to be noted that in the description that follows, one side of a vehicle body structure laterally away from the longitudinal center thereof in a condition, in which the bearing assembly is mounted on the vehicle body structure, is referred to as "outboard side" while the opposite side of the vehicle body structure laterally close towards the longitudinal center thereof in the same condition is referred to as "inboard side".

Figure 1:
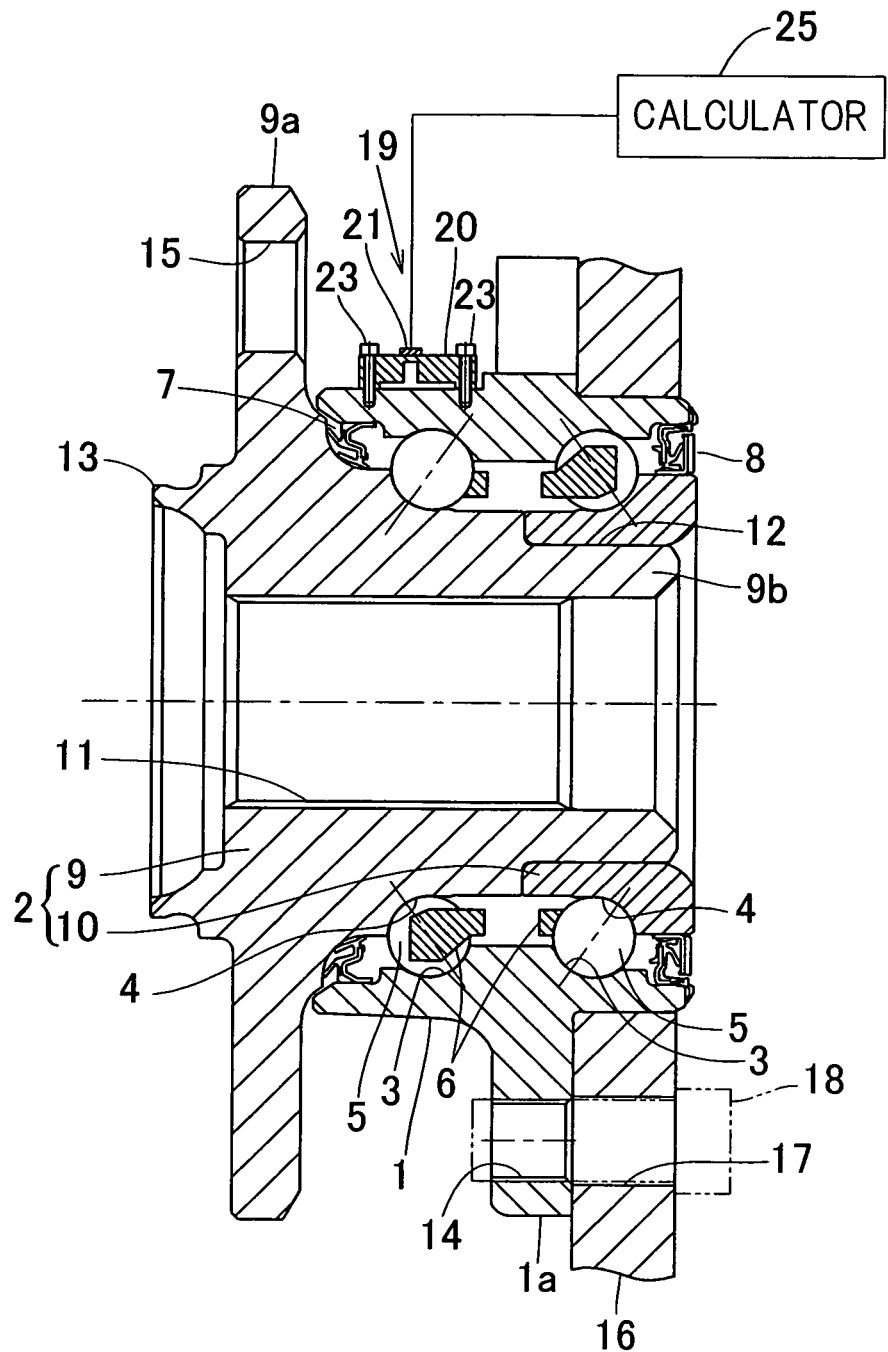
FIG. 1 is a sectional view showing a sensor-equipped wheel support bearing assembly according to a first embodiment of the present invention.

A bearing unit employed in this sensor-equipped wheel support bearing assembly includes, as shown in a sectional view in FIG. 1, an outer member 1 having an inner periphery formed with a plurality of rolling surfaces 3, an inner member 2 having rolling surfaces 4 defined therein in face-to-face relation with the respective rolling surfaces 3 of the outer member 1, and a plurality of rows of rolling elements 5 interposed rollingly between the rolling surfaces 3 in the outer member 1 and the rolling surfaces 4 in the inner member 2. This wheel support bearing assembly is rendered to be of a double row angular contact ball bearing type, in which the rolling elements 5 are employed in the form of balls and are retained by a retainer 6 employed for each of the rows. The rolling surfaces 3 and 4 have a sectional shape representing an arcuate shape and are so formed as to permit the ball contact angles to lie in back-to-back relation with each other. Opposite ends of a bearing space delimited between the outer member 1 and the inner member 2 are sealed by a pair of sealing members 7 and 8.

The outer member 1 serves as a stationary member and is of one piece construction including a vehicle body fitting flange 1a defined in an outer periphery thereof and adapted to be secured to a knuckle 16 of a suspension system (not shown) of an automotive vehicle. The flange 1a has vehicle body fitting bolt holes 14 defined therein at a plurality of locations spaced in a direction circumferentially thereof and, the vehicle body fitting flange 1a can be secured to the knuckle 16 when knuckle bolts 18 inserted from an inboard side into respective bolt insertion holes 17 defined in the knuckle 16 are threaded into the corresponding bolt holes 14.

The inner member 2 serves as a rotating member and includes a hub unit 9 having a wheel mounting hub flange 9a formed therein, and an inner ring 10 mounted on an outer periphery of an inboard end of a hub axle 9b of the hub unit 9. The rows of the rolling surfaces 4 referred to above are formed respectively in the hub unit 9 and the inner ring 10. An outer periphery of an inboard end of the hub unit 9 is provided with an inner ring mounting surface 12 that is stepped to have a reduced diameter, with the inner ring 10 mounted on this inner ring mounting surface 12. The hub unit 9 has a center portion formed with a through-hole 11 and the hub flange 9a is provided with press fitting holes 15 defined at a plurality of locations, spaced in a direction circumferentially thereof, for receiving corresponding hub bolts (not shown). In proximity to a root portion of the hub flange 9a of the hub unit 9, a cylindrical pilot portion 13 for guiding a vehicle wheel and a brake component protrudes towards the outboard side.

Figure 2:
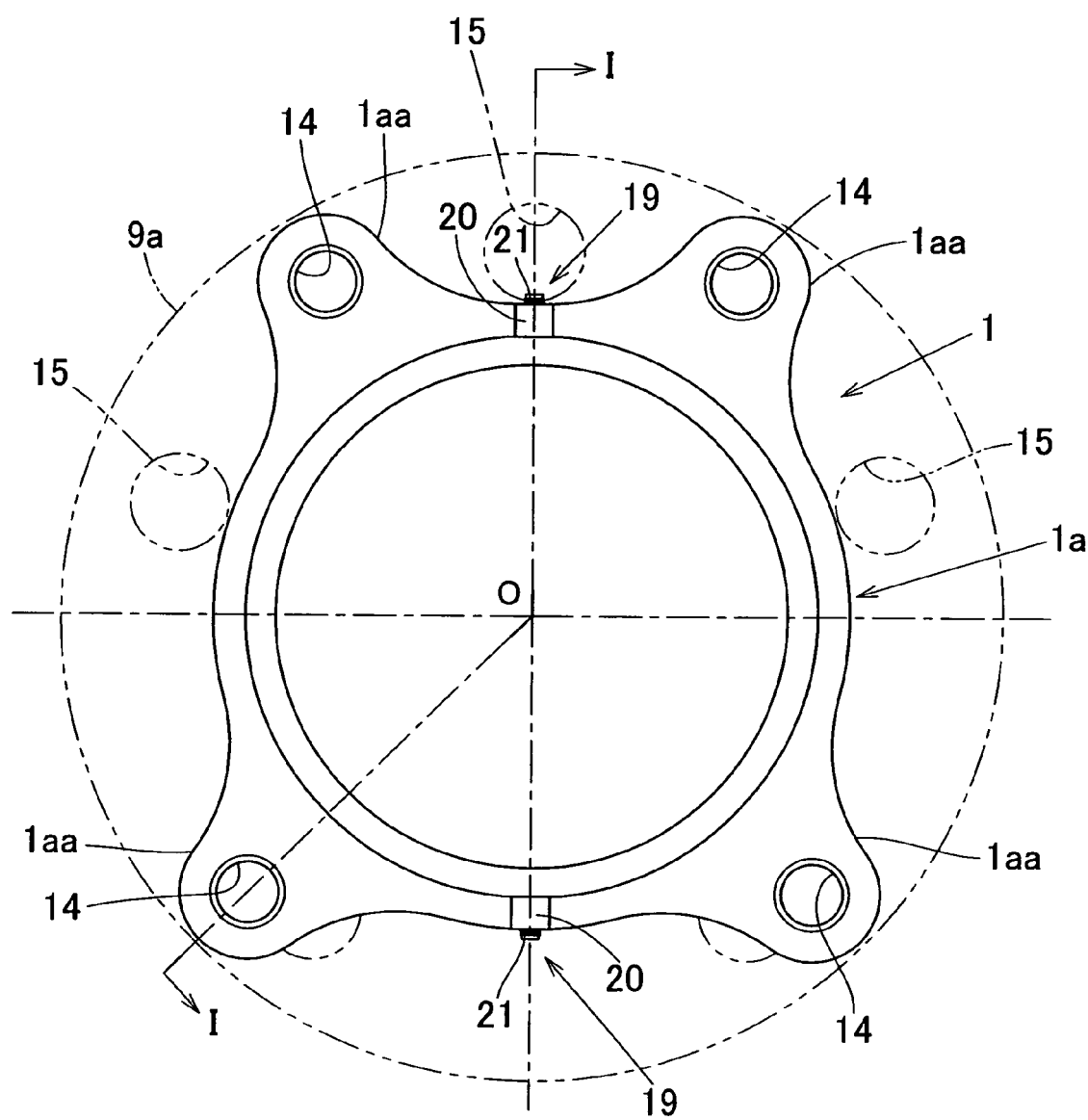
FIG. 2 is a front elevational view showing an outer member forming a part of the sensor-equipped wheel support bearing assembly.

FIG. 2 illustrates a front elevational view showing the outer member 1 of the wheel support bearing assembly as viewed from the outboard side. It is to be noted that FIG. 1 illustrates the sectional view taken as viewed along the arrow headed line I-O-I in FIG. 2. The vehicle body fitting flange 1a referred to previously is, as best shown in FIG. 2, formed as a projecting segment 1aa which is formed by projecting portion of the circumferential area, where each of the corresponding bolt hole 14 is formed, in a direction radially outwardly beyond the remaining area.

A sensor unit 19 is provided on an outer diametric surface of the outer member 1 serving as the stationary member. In the instance as shown, the sensor unit 19 is provided at each of two locations in the outer diametric surface of the outer member 1, that is, on upper and lower surface portions of the outer diametric surface of the outer member 1, which are positioned one above the other in a vertical direction perpendicular to a tire tread so that a load Fz acting on the wheel support bearing assembly in the vertical direction can be detected. More specifically, as best shown in FIG. 2, one of the sensor units 19 is arranged on an area of the upper surface portion of the outer diametric surface of the outer member 1, which lies at a middle portion between the neighboring two projecting segments 1aa, while the other of the sensor units 19 is arranged on an area of the lower surface portion of the outer diametric surface of the outer member 1, which similarly lies at a middle portion between the neighboring two projecting segments 1aa.

Figure 3:
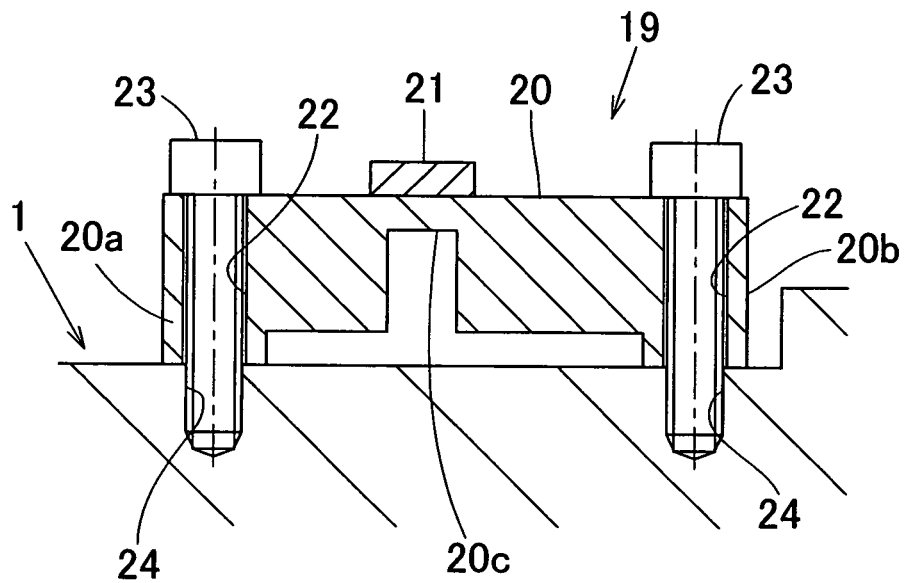
FIG. 3 is an enlarged sectional view showing a sensor unit installation area shown in FIG. 1.

As best shown in an enlarged sectional view in FIG. 3, each of the sensor units 19 includes a strain generating member 20 and a sensor 21 fitted to the strain generating member 20 for detecting a strain induced in the strain generating member 20. The strain generating member 20 is made of a metallic material such as, for example, a steel material. This strain generating member 20 has two inwardly protruding contact fixing segments 20a and 20b on an inner surface side confronting the outer diametric surface of the outer member 1 and is fixed directly to the outer diametric surface of the outer member 1 through those contact fixing segments 20a and 20b. Of the two contact fixing segments 20a and 20b, one contact fixing segment 20b is arranged at an axial position, which corresponds to a circumference of the rolling surface 3 of the outboard row in the outer member 1 while the other contact fixing segment 20a is arranged at an axial position on the outboard side further away from this axial position of the contact fixing segment 20b, and those contact fixing segments 20a and 20b are arranged at the respective positions that are in the same phase in the direction circumferentially of the outer member 1. It is to be noted that in order for the sensor units 19 to be stably fixed to the outer diametric surface of the outer member 1, portions of the strain generating member 20 on the outer diametric surface of the outer member 1, to which the corresponding contact fixing segments 20a and 20b of the sensor units 19 are fixed in contact therewith are preferably formed with flat areas.

Also, the strain generating member 20 has a center portion formed with a cutout portion 20c that opens at the inner surface side thereof. The sensor 21 is pasted to an area of the strain generating member 20, where the strain occurs considerably relative to a load acting in various directions. In the instance as shown, for that area, an area of the strain generating member 20 in the proximity of the cutout portion 20c, more specifically an area on an outer surface side of the strain generating member 20 and on a rear side of the cutout portion 20c is selected so that the sensor 21 can detect the strain occurring in the proximity of the cutout portion 20c.

Fixture of the contact fixing segments 20a and 20b of the strain generating member 20 to the outer diametric surface of the outer member 1 is carried out by passing bolts 23 through bolt insertion holes 22, defined in the contact fixing segments 20a and 20b so as to extend completely therethrough in the radial direction, and then threading those bolts 23 into corresponding bolt holes 24 defined in an outer peripheral portion of the outer member 1. Alternatively, the fixture may be carried out by the use of a bonding material. At areas of the strain generating member 20 other than the contact fixing segments 20a and 20b, gaps are formed between the strain generating member 20 and the outer diametric surface of the outer member 1.

The sensor 21 of the sensor units 19 is connected with a calculator 25. This calculator 25 calculates a working force acting between a tire of the vehicle wheel and a road surface in reference to an output signal from the sensor 21 and includes, for example, a signal processing circuit and a correcting circuit. The calculator 25 also includes a relation setting section (not shown), in which a relation of the working force, acting between the tire of the vehicle wheel and the road surface, with the output signal of the sensor 21 is set in terms of an arithmetic expression or a table or the like and makes use of the relation setting section to output the working force from the output signal which has been inputted. Contents of the relation to be set in the relation setting section are determined by a series of preparatory tests and/or simulations and are then set therein.

When a load acts between the tire of the vehicle wheel and the road surface, such load is applied to the outer member 1, which is the stationary member of the wheel support bearing assembly, accompanied by deformation. If the sensor unit 19 is installed on, for example, the projecting segments 1aa of the vehicle body fitting flange 1a so that the load can be calculated from the deformation of the vehicle body fitting flange 1a, hysteresis occurs in the output signal as discussed in connection with the related art.

In this embodiment, one of the contact fixing segment 20b of the strain generating member 20 in the sensor unit 19 is fixed to the axial position of the outer diametric surface of the outer member 1, which corresponds to a circumference of the rolling surface 3 of the outboard row. Since this axial position is the site at which the load acting on a tire tread is transmitted from the inner member 2 through the rolling elements 5, the amount of deformation is relatively large at the site. On the other hand, the other of the contact fixing segments, that is, the contact fixing segment 20a of the strain generating member 20 is fixed to the axial position on the outboard side away from the one of the contact fixing segments, that is, the contact fixing segment 20b and this axial position is the site at which the amount of deformation is small as compared with that at the previously described axial position of the contact fixing segment 20b. As a result thereof, the strain occurring in the outer diametric surface of the outer member 1 is, after having been amplified, transmitted to the strain generating member 20 and the amplified strain is then detected by the sensor 21. Also, the amount of deformation occurring in the outer member 1 upon application of the load thereto varies depending on the axial position, but since in the instance as shown, the two contact fixing segments 20a and 20b of the strain generating member 20 in the sensor unit 19 are fixed to the outer diametric surface of the outer member 1 in the same phase relative to each other in the circumferential direction, the strain tends to concentrate on the strain generating member 20 and the detecting sensitivity can increase correspondingly.

The calculator 25 is operable to calculate from the output signal of the sensor 21 the load acting on the wheel support bearing assembly. As a result, the working force acting between the tire of the vehicle wheel and the road surface can be detected with a high sensitivity even when the automotive vehicle is held halted or it is driven at a low speed. Since as hereinbefore described, the sensor unit 19 is not secured to any projecting segment 1aa of the vehicle body fitting flange 1a, which would constitute a cause of the hysteresis, the hysteresis occurring in the output signal of the sensor 21 can be reduced and, therefore, the load can be calculated accurately.

Also, the calculator 25 referred to above may be of a type capable of not only the working force acting between the tire of the vehicle wheel and the road surface, but also a force acting on the wheel support bearing assembly (for example, an amount of preload).

When the detected load obtained from the sensor-equipped wheel support bearing assembly is used in controlling the automotive vehicle, it can contribute to the stabilized travel of the automotive vehicle. Also, when this sensor-equipped wheel support bearing assembly is utilized, the load sensor can be installed on the automotive vehicle compactly and the mass productivity becomes excellent, resulting in capability of reducing the cost.

Figure 4:
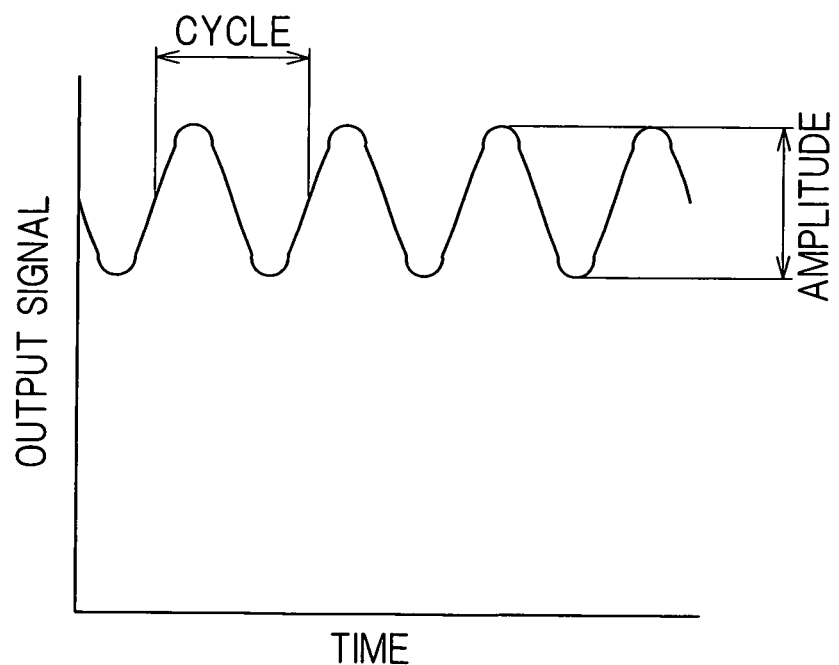
FIG. 4 is a chart showing a waveform of an output signal of a sensor employed in the sensor-equipped wheel support bearing assembly.

Also, depending on the presence or absence of the rolling elements 5 then moving past a site in the rolling surfaces 3 in the vicinity of the sensor unit 19, such a cyclic change may occur in the amplitude of the output signal of the sensor 21 in the sensor unit 19 as shown in a waveform in FIG. 4. The reason therefor is because the amount of deformation during the presence of the rolling elements 5 moving past that site differs from that during the absence of the rolling elements 5 past that site and, therefore, the amplitude of the output signal of the sensor 21 may have a peak value for each cycle movement of the rolling elements 5. In view of this, the speed of movement of the rolling elements 5, that is, the number of revolutions of the vehicle wheel can be detected by measuring the cycle of the peak value in the detected signal by means of, for example, the calculator 25. As hereinabove described, in the event that any change appears in the output signal, the load may be calculated in terms of the average value or the amplitude of the output signal. Where any change does not appear in the output signal, the load may be calculated in terms of the absolute value of the sensor signal.

Also, since in this embodiment described above, the strain generating member 20 of the sensor unit 19 is provided with the cutout portion 20c and the sensor 21 is disposed around this cutout portion 20c, the strain amplified and then transmitted from the outer diametric surface of the outer member 1 to the strain generating member 20 can be easily concentrated on the cutout portion 20c, accompanied by increase of the sensitivity with which the sensor 21 detects and, therefore, the load can be calculated further accurately.

In addition, since in this embodiment described above, as best shown in FIG. 2, the sensor unit 19 is arranged on the outer diametric surface of the outer member 1 at a location about middle portion between the respective projecting segments 1aa of the neighboring vehicle body fitting flange 1a in the outer member 1, the sensor unit 19 is provided at a location remote from the projecting segments 1aa, which would otherwise constitute a cause of the hysteresis, and, therefore, the hysteresis appearing in the output signal of the sensor 21 can be reduced, allowing the load to be detected further accurately.

Yet, since in this embodiment described above, the sensor unit 19 is provided at the position on the outer diametric surface of the outer member 1, to which the load of the rolling elements 5 can be applied at all times even through the load Fy acting in the vertical direction or the load Fy acting in a forward and rearward direction is applied, that is, at the position on the outer diametric surface of the outer member 1, which lies in an upper surface above the tire tread, the load can be accurately calculated in any situation. Also, since the sensor unit 19 is of a type capable of detecting and amplifying even slight strain, even the load Fz acting in the vertical direction, which may result in a small amount of deformation of the outer member 1, can be detected with a high sensitivity.

Figure 5:
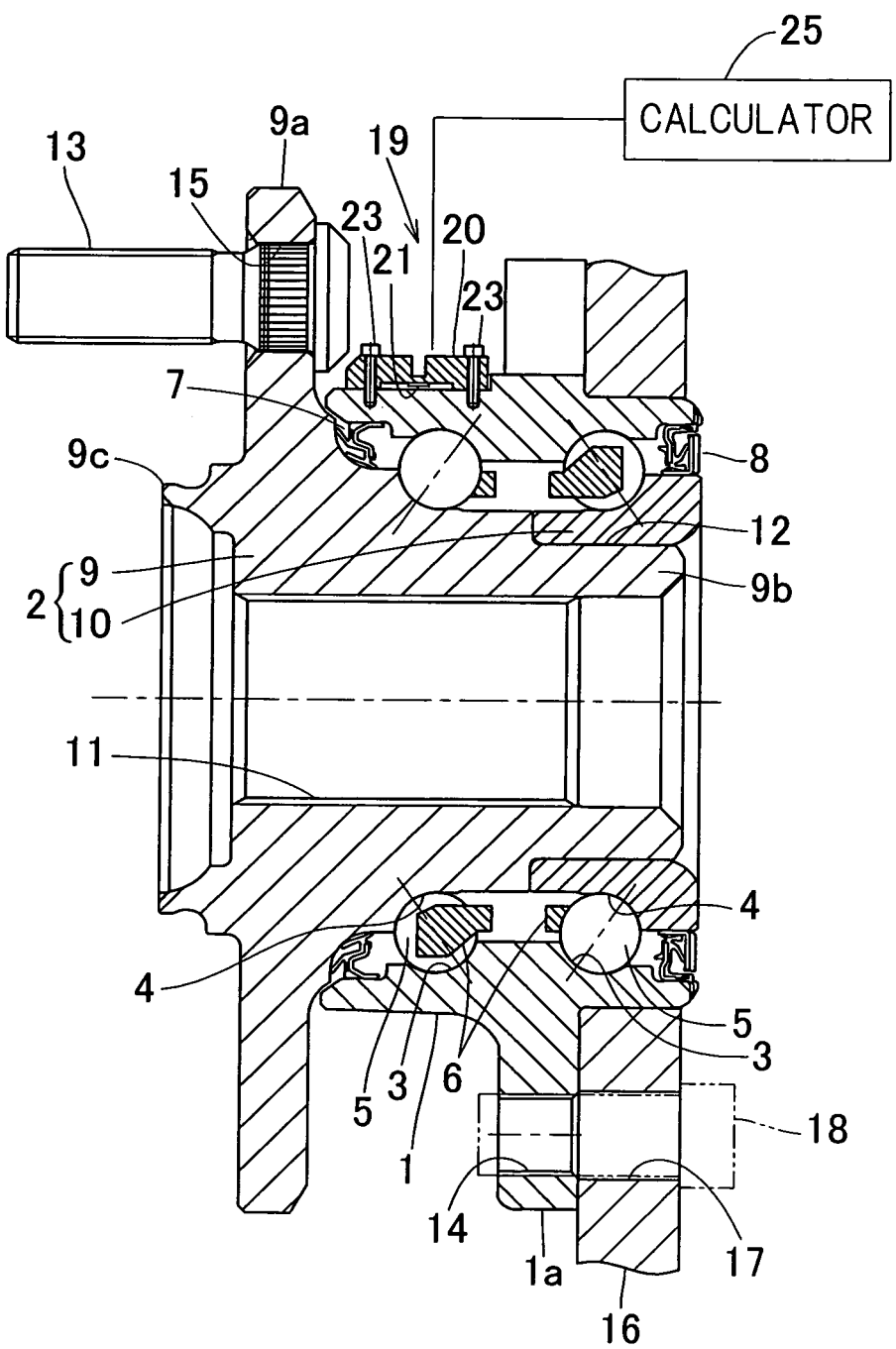
FIG. 5 is a sectional view showing the sensor-equipped wheel support bearing assembly according to a second embodiment of the present invention.
Figure 7:
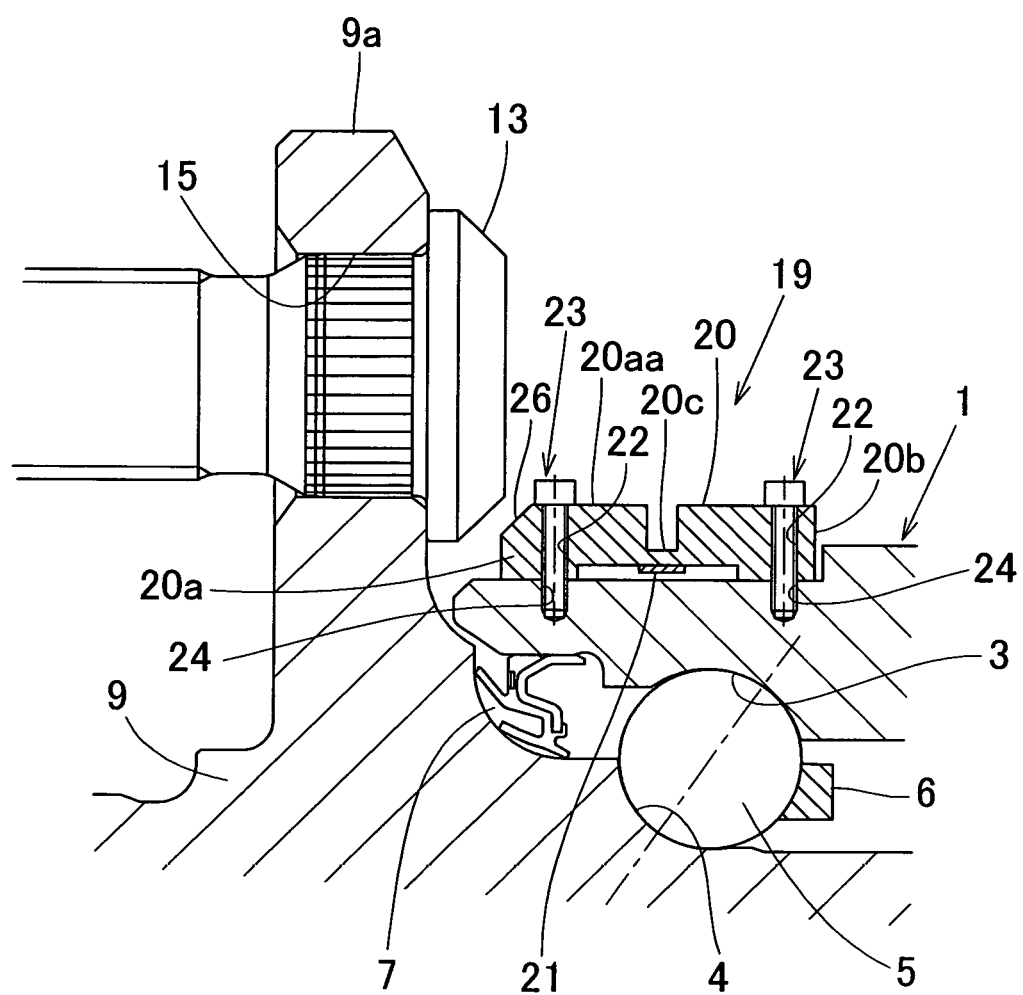
FIG. 7 is an enlarged sectional view showing the sensor unit installation area shown in FIG. 5.

In the next place, a second embodiment of the present invention will be described in detail with particular reference to FIGS. 5 and 7. In those figures, component parts similar to those shown in and described with reference to FIGS. 1 to 3 in connection with the first embodiment of the present invention are designated by like reference numerals employed therein and the details thereof are not reiterated for the sake of brevity, noting that only portions of the second embodiment that differ from the first embodiment will be described.

In this second embodiment, unlike the first embodiment described hereinbefore, the strain generating member 20 of the sensor unit 19 has a middle portion formed with a cutout portion 20c opening at an outer surface side. The sensor 21 is pasted to an area of the strain generating member 20, where the strain occurs considerably relative to a load acting in various directions. In the instance as shown, for that area, an area of the strain generating member 20 proximate to the cutout portion 20, more specifically an area on an inner surface side of the strain generating member 20 and on a rear side of the cutout portion 20c is selected so that the sensor 21 can detect the strain occurring in the proximity of the cutout portion 20c.

As is the case with the previously described first embodiment, the sensor unit 19 is provided at each of two locations on upper and lower surface portions of the outer diametric surface of the outer member 1 and is arranged at a middle portion between the neighboring projecting segments 1aa.

The strain generating member 20 is of such a shape that a surface portion 20aa thereof, which is positioned on a radially outer side of the contact fixing segment 20a that is positioned on an outboard side relative to the cutout portion 20c will not interfere with the hub bolts 13. More specifically, as best shown in FIG. 7, an outboard corner of the surface portion 20aa of the strain generating member 20, which is positioned on a radially outer side of the contact fixing segment 20a that is positioned on an outboard side relative to the cutout portion 20c, is chamfered to provide a chamfered corner portion 26 of a shape effective to avoid interference with the hub bolts.

In particular, since the surface portion 20aa (FIG. 7) of the strain generating segment 20, which is positioned on the radially outer side of the outboard contact fixing segment 20a, selected out of the two contact fixing segments 20a and 20b, that is positioned on an outboard side relative to the cutout portion 20c, has the shape that will not interfere with the hub bolts 13, it is possible to avoid damages to the sensor unit 19 and a detection failure, which would result from the interference, and, therefore, not only can the safety factor be increased, but also the sensor unit 19 can be utilized for a long period of service. In the instance as shown, the outboard corner of the surface portion 20aa of the contact fixing segment 20a in the strain generating member 20 is defined as the chamfered corner portion 26 and, therefore, that surface portion of the contact fixing segment can be formed with a simple processing to a shape effective to avoid interference with the hub bolts.

Figure 8:
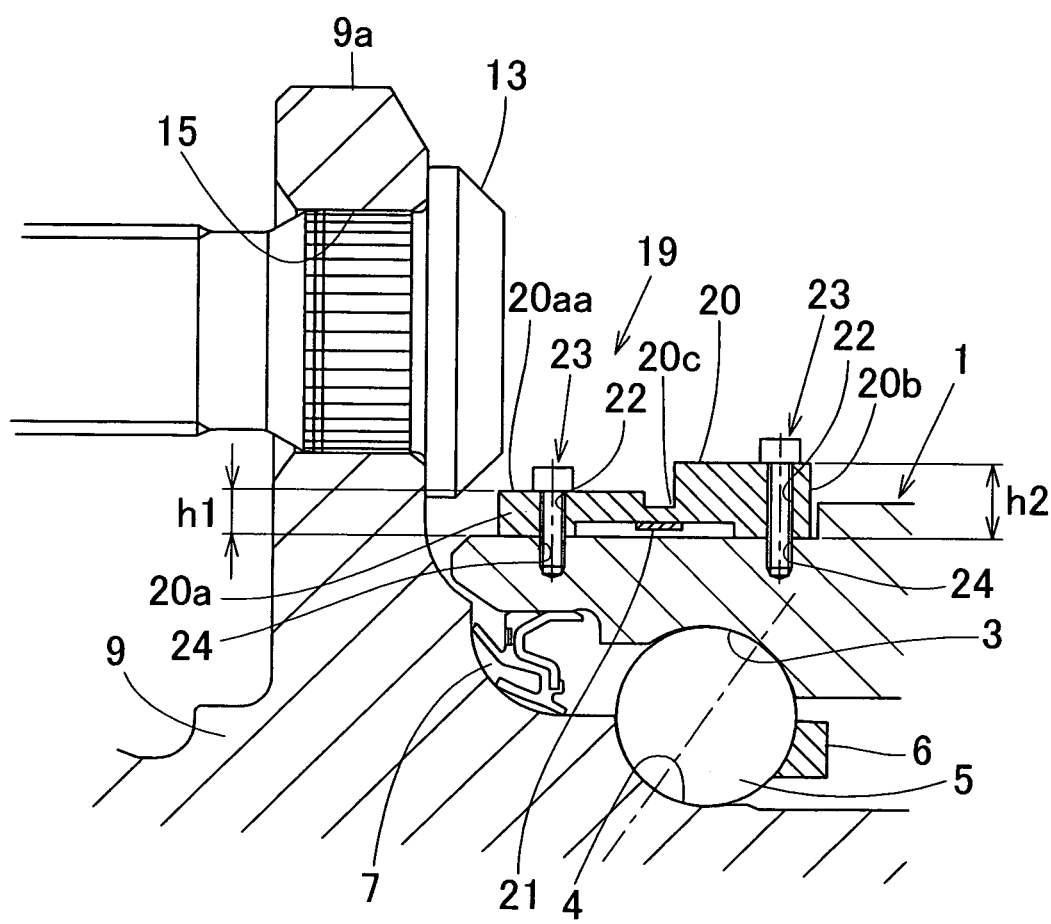
FIG. 8 is an enlarged sectional view showing the sensor unit installation area in the sensor-equipped wheel support bearing assembly according to a third embodiment of the present invention.

FIG. 8 illustrates a fragmentary enlarged sectional view showing a third embodiment of the present invention. This embodiment is similar to the sensor-equipped wheel support bearing assembly according to the previously described second embodiment and shown in FIGS. 5 to 7, but differs therefrom in that of the two contact fixing segments 20a and 20b of the strain generating member 20 in the sensor unit 19, the contact fixing segment 20a on the outboard side relative to the cutout portion 20c has the surface portion 20aa of a protruding height h1, that is, the height h1 protruding from the outer diametric surface of the outer member 1, is so chosen as to be lower than the protruding height h2 of the contact fixing segment 20b, which lies on the inboard side relative to the cutout portion 20c, protruding from the outer diametric surface of the outer member 1. By so choosing, the surface portion 20aa of the outboard contact fixing segment 20a on the outboard side relative to the cutout portion 20c, which is opposite to a surface of contact with the outer diametric surface of the outer member 1, is rendered to have a shape effective to avoid interference with the hub bolts 13. Other structural features are similar to those shown in and described with reference to FIGS. 5 to 7 in connection with the previously described second embodiment.

Figure 9:
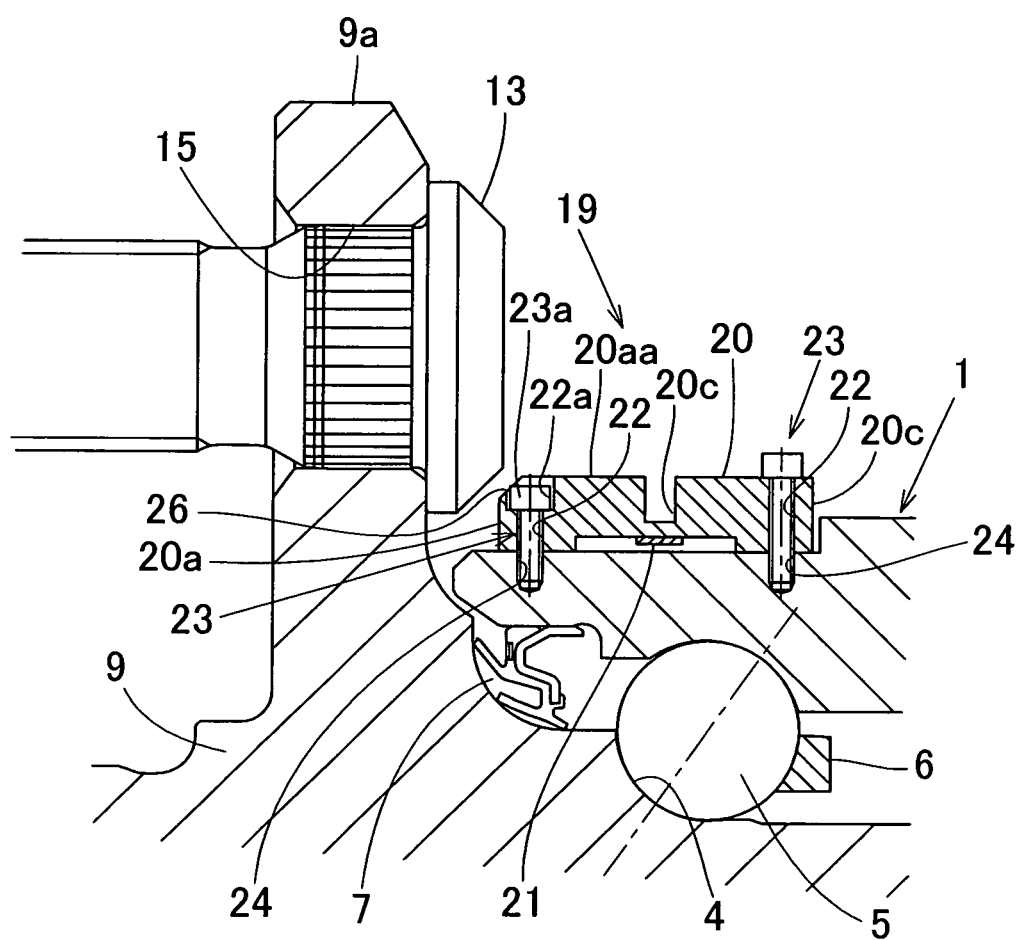
FIG. 9 is an enlarged sectional view showing the sensor unit installation area in the sensor-equipped wheel support bearing assembly according to a fourth embodiment of the present invention.
Figure 10:
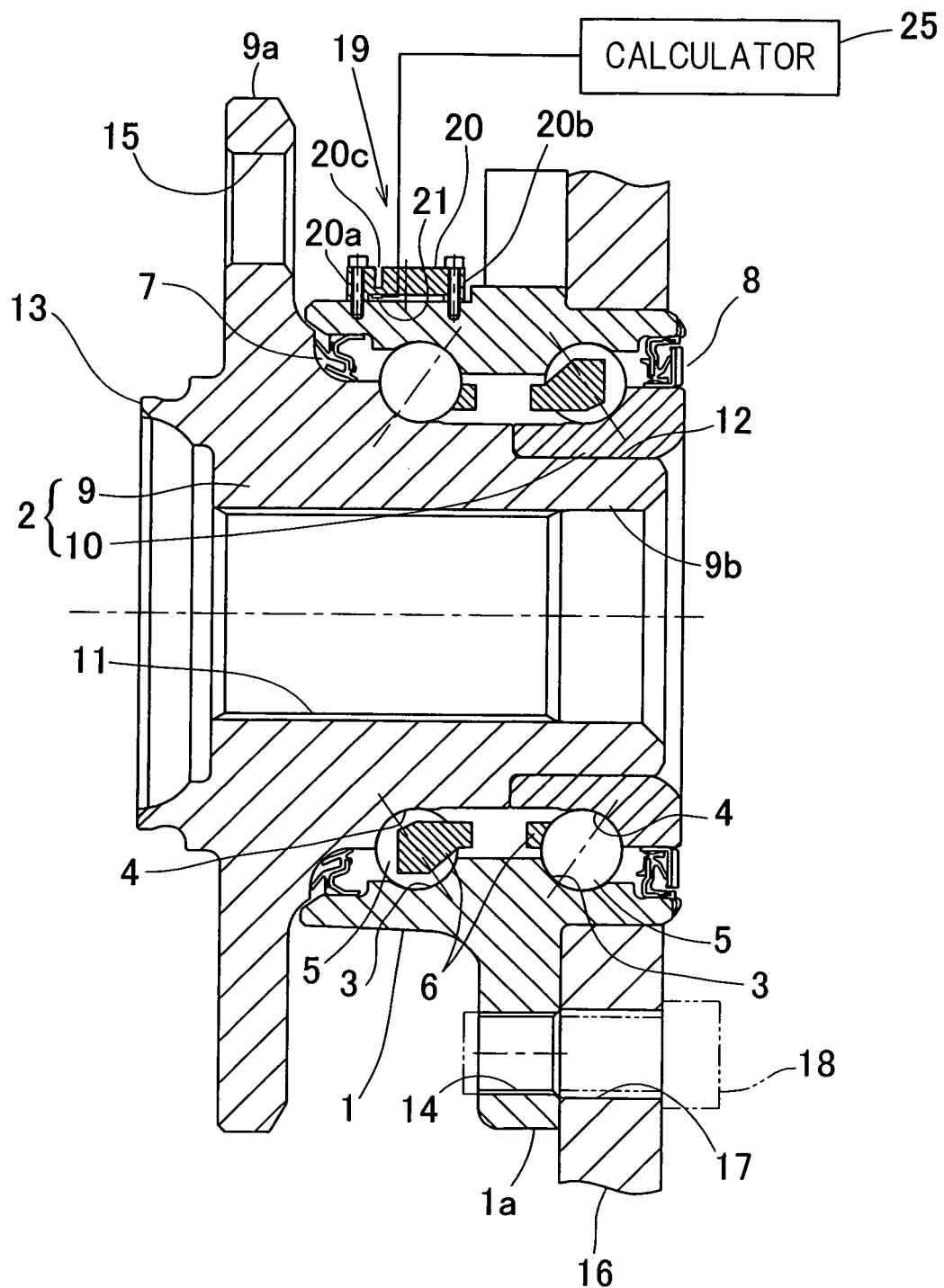
FIG. 10 is a sectional view showing the sensor-equipped wheel support bearing assembly according to a fifth embodiment of the present invention.
Figure 11:
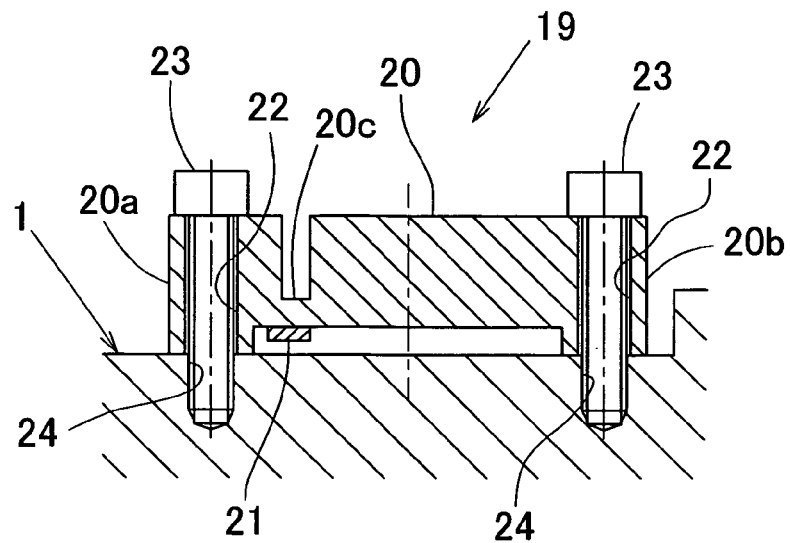
FIG. 11 is an enlarged sectional view showing the sensor unit installation area shown in FIG. 10.

FIG. 9 illustrates a fragmentary enlarged sectional view showing a fourth embodiment of the present invention. This embodiment is similar to the sensor-equipped wheel support bearing assembly according to the second embodiment shown in and described with reference to FIGS. 5 to 7, but differs therefrom in that not only is the outboard corner portion of the surface portion 20aa of the strain generating member 20, which is positioned on a radially outer side of the contact fixing segment 20a that is positioned on an outboard side relative to the cutout portion 20c, chamfered to provide the chamfered corner portion 26, but also a counterbore 22a for receiving a head 23a of a bolt therein is provided in the bolt insertion hole 22 in the contact fixing segment 20a, through which the bolt 23 is inserted. By so doing, the surface portion 20aa of the outboard contact fixing segment 20a of the strain generating member 20 is rendered to have a shape effective to avoid the interference with the hub bolts 13.

Figure 6:
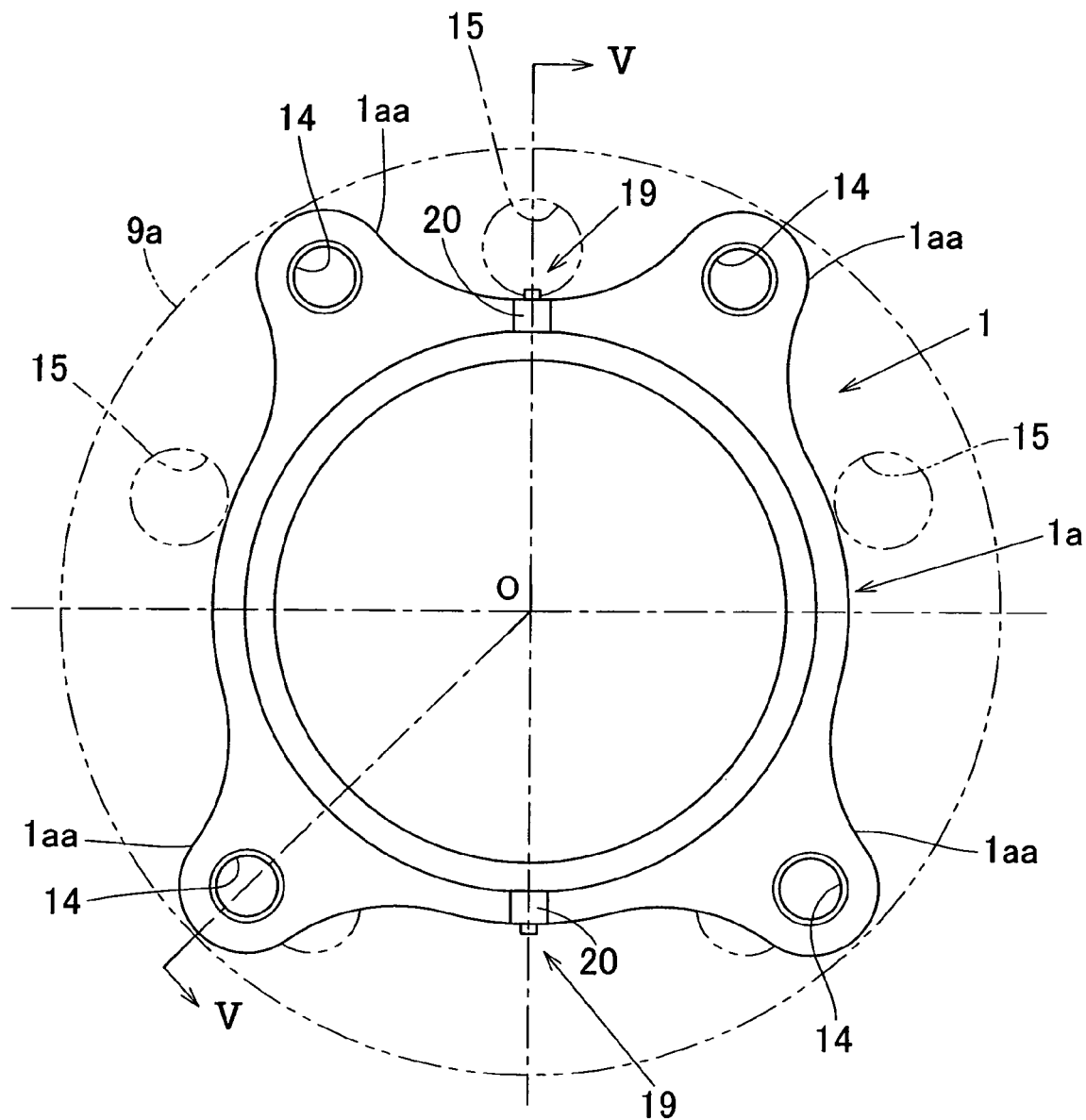
FIG. 6 is a front elevational view showing the outer member forming a part of the sensor-equipped wheel support bearing assembly.

Other structural features are similar to those shown in and described with reference to FIGS. 5 to 7 in connection with the previously described second embodiment. It is to be noted that the counterbore 22a may only be provided in the bolt insertion hole 22 with the chamfered corner portion 26 dispensed with. The formation of the counterbore 22a in the bolt insertion hole 22 allows the head 23a of the bolt 23 to be buried within the surface portion 20aa of the contact fixing segment 20a and, therefore, any possible interference of the bolt head 23a with the hub bolts 13 can be avoided advantageously. Also, mere formation of the counterbore 22a in the bolt insertion hole 22 is so sufficient that the shape effective to avoid the interference with the hub bolts can be obtained with a simple processing.

Hereinafter, a fifth embodiment of the present invention will be described in detail with particular reference to FIGS. 10 to 13A and 13B. In those figures, component parts similar to those shown in and described with reference to FIGS. 1 to 3 in connection with the first embodiment of the present invention are designated by like reference numerals employed therein and the details thereof are not reiterated for the sake of brevity, noting that only portions of the fifth embodiment that differ from the first embodiment will be described.

Figure 12A:
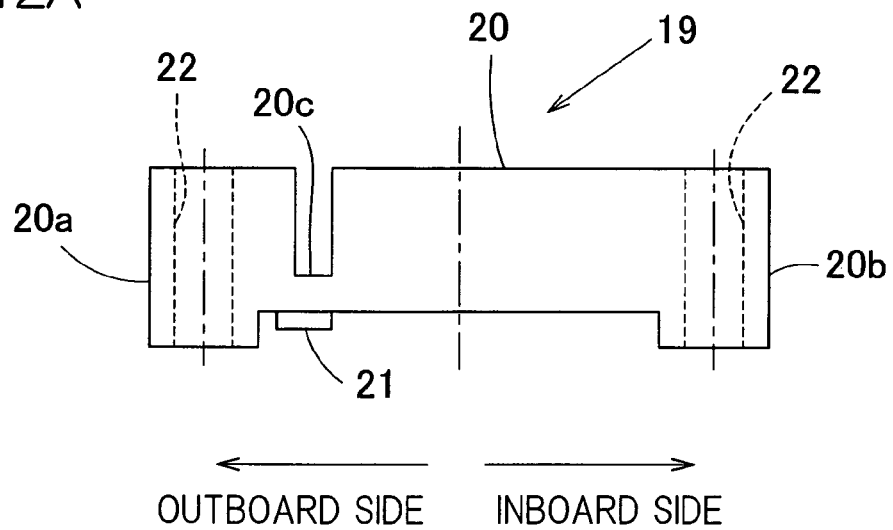
FIG. 12A is a front elevational view showing one constructional example of the sensor unit employed in the sensor-equipped wheel support bearing assembly.
Figure 12B:
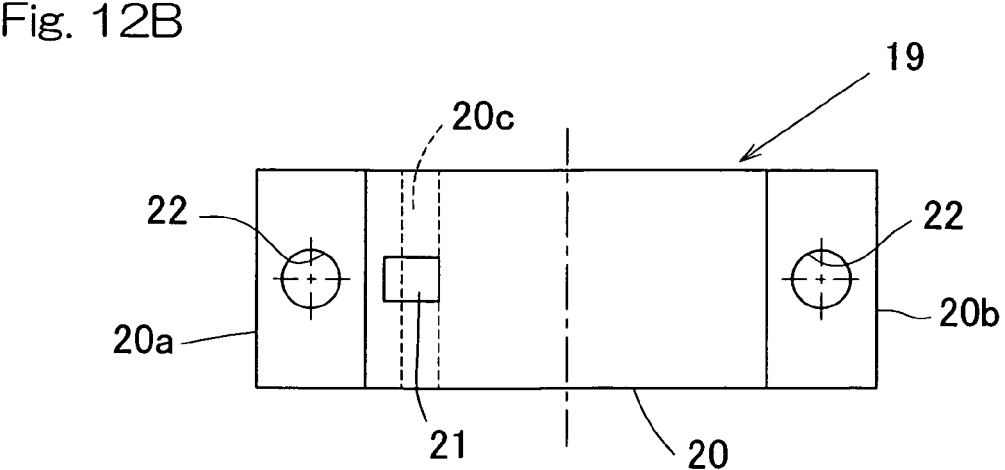
FIG. 12B is a bottom plan view showing the sensor unit.

In this fifth embodiment of the present invention, the cutout portion 20c is formed in the strain generating member 20 of the sensor unit 19 at a location on the outboard side and remote from the middle portion between the two contact fixing segments 20a and 20b. As shown in FIGS. 12A and 12B showing one example of the structure of the sensor unit 19 in a front elevational view and a bottom plan view (a representation as viewed from the inner surface side confronting the outer diametric surface of the outer member 1), respectively, the illustrated instance utilizes the cutout portion 20c of such a shape that a portion of the outer surface of the strain generating member 20 is cut out inwardly of the strain generating member 20 towards an inner surface thereof. This cutout portion 20c has a widthwise dimension that is rendered to be 2 mm or smaller. The sensor 21 is pasted to an area of the strain generating member 20, where the strain occurs considerably relative to a load acting in various directions. In the instance as shown, for that area, an area of the strain generating member 20 proximate to the cutout portion 20c, more specifically an area on an inner surface side of the strain generating member 20 and on a rear side of the cutout portion 20c is selected so that the sensor 21 can detect the strain occurring in the proximity of the cutout portion 20c. It is to be noted that the strain generating member 20 is preferably of a type which will not undergo any plastic deformation even when the expected maximum force is applied as an external force acting on the outer member 1 in the form of the stationary member, or the working force acting between the tire and the road surface. Once such a plastic deformation occurs, the deformation of the outer member 1 will not be transmitted accurately to the sensor unit 19 and, therefore, measurement of the strain will be adversely affected. The expected maximum force referred to above is, for example, the maximum force which will not result in such a damage which will otherwise hamper the normal operation of the wheel support bearing assembly as a bearing assembly.

As is the case with that in the previously described first embodiment, the sensor unit 19 is provided at two locations, i.e., the upper and lower surface portion of the outer diametric surface of the outer member shown in FIG. 2 and the sensor unit 19 is arranged at the middle portion between the neighboring projecting segments 1aa.

Figure 13A:
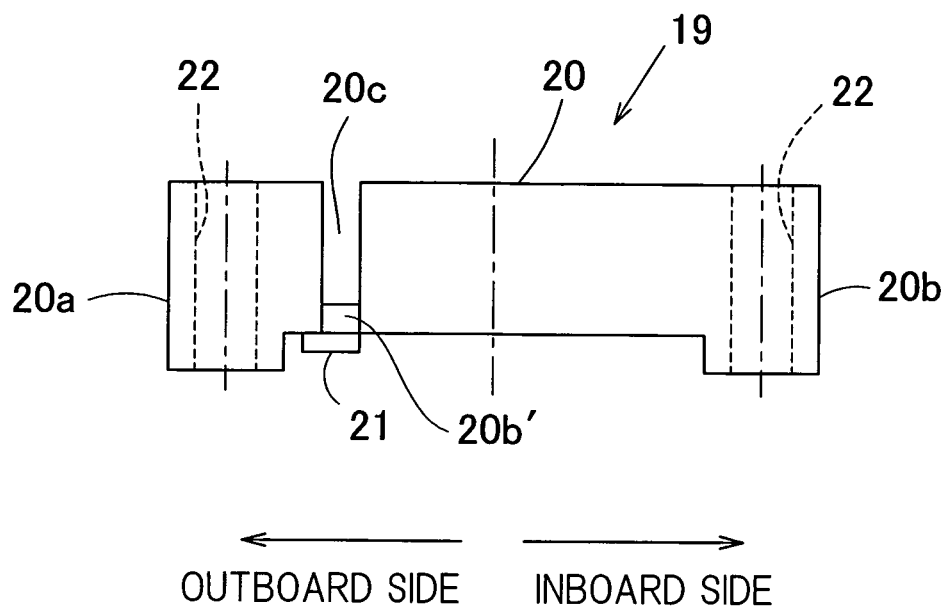
FIG. 13A is a front elevational view showing another constructional example of the sensor unit employed in the sensor-equipped wheel support bearing assembly.
Figure 13B:
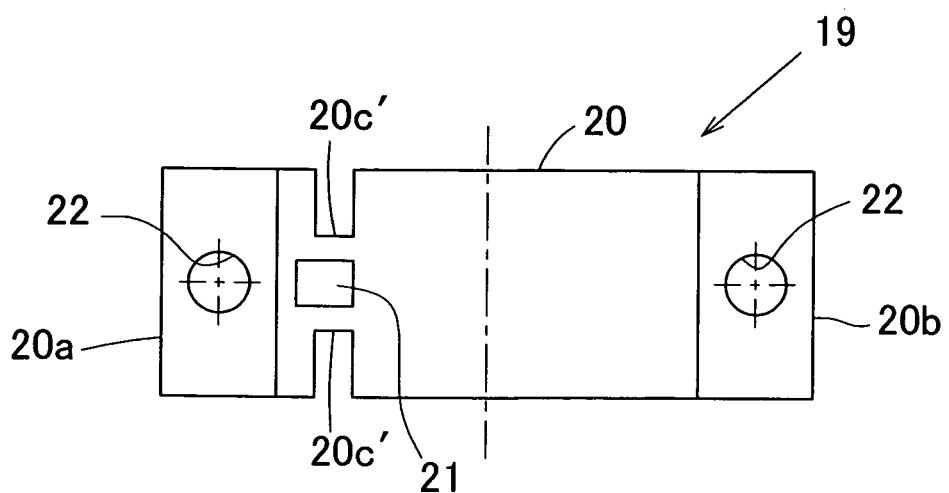
FIG. 13B is a bottom plan view showing the sensor unit.

FIGS. 13A and 13B illustrate a front elevational view and a bottom plan view, respectively, showing another example of the structure of the sensor unit 19. In this structural example, additionally to the structural example shown in and described with reference to FIGS. 12A and 12B, cutout portions 20c' are formed so as to extend inwardly of the strain generating member 20 from widthwise opposite surfaces thereof, which lie in a direction perpendicular to the direction of arrangement of the two contact fixing segments 20a and 20b in the strain generating member 20, in a direction widthwise thereof towards a portion of the strain generating member 20, where the sensor 21 is mounted. Other structural features are similar to those shown in and described with reference to FIGS. 12A and 12B.

In this embodiment, since the strain generating member 20 of the sensor unit 19 is provided with the cutout portion 20c and the sensor 21 is provided in the vicinity of this cutout portion 20c, the strain amplified and transmitted from the outer diametric surface of the outer member 1 can be easily concentrated on the cutout portion 20c and, accordingly, the sensitivity of detection with the sensor 21 can be increased. Moreover, since the cutout portion 20c is arranged on the outboard side and remote from the middle portion between the two contact fixing segments 20a and 20b of the strain generating member 20, the distance between the contact fixing segment 20a, which is fixed at the axial position at which the amount of deformation is large, and the cutout portion 20c is increased and a circumference of the cutout portion 20c undergoes a deformation in response to the moment acting thereon, and the strain concentrates on the circumference of the cutout portion 20c, resulting in further increase of the detecting sensitivity.

When in this embodiment the cutout portion 20c in the sensor unit 19 is of such a shape as having been cut out from the outer surface side of the strain generating member 20 in a direction inwardly towards the inner surface side thereof such as in the structural example shown in and described with reference to FIGS. 12A and 12B, one contact fixing segment 20b of the contact fixing segments is fixed at the axial position, which corresponds to a circumference of the outboard rolling surface 3, at which the amount of deformation is relatively large in the outer diametric surface of the outer member 1, while the other contact fixing segment 20a of the contact fixing segments is fixed at the axial position further on the outboard side, at which the amount of deformation is relatively small, and, accordingly, the circumference of the cutout portion 20c is strained as a result of the deformation of the outer diametric surface of the outer member 1 with the strain around the cutout portion 20c increased consequently and, hence, the load can be calculated with a further high sensitivity.

Also, when in this embodiment the cutout portion 20c of the sensor unit 19 is of such a shape as having been cut out inwardly from both of the widthwise opposite side surfaces of the strain generating member 20 in a direction inwardly thereof which lies perpendicular to the direction of arrangement of the two contact fixing segments 20a and 20b, such as in the structural example shown in and described with reference to FIGS. 13A and 13B, the strain will not be dispersed and will easily concentrate on a localized portion and, therefore, the load can be calculated with a further high sensitivity.

In addition, although if the cutout portions 20c has a large width, the strain will be dispersed, since, in this case, the widthwise dimension of the cutout portion 20c is so chosen as to be 2 mm or smaller the strain will not be dispersed and will easily concentrate on a localized portion and, therefore, the load can be calculated with a further high sensitivity.

Figure 14:
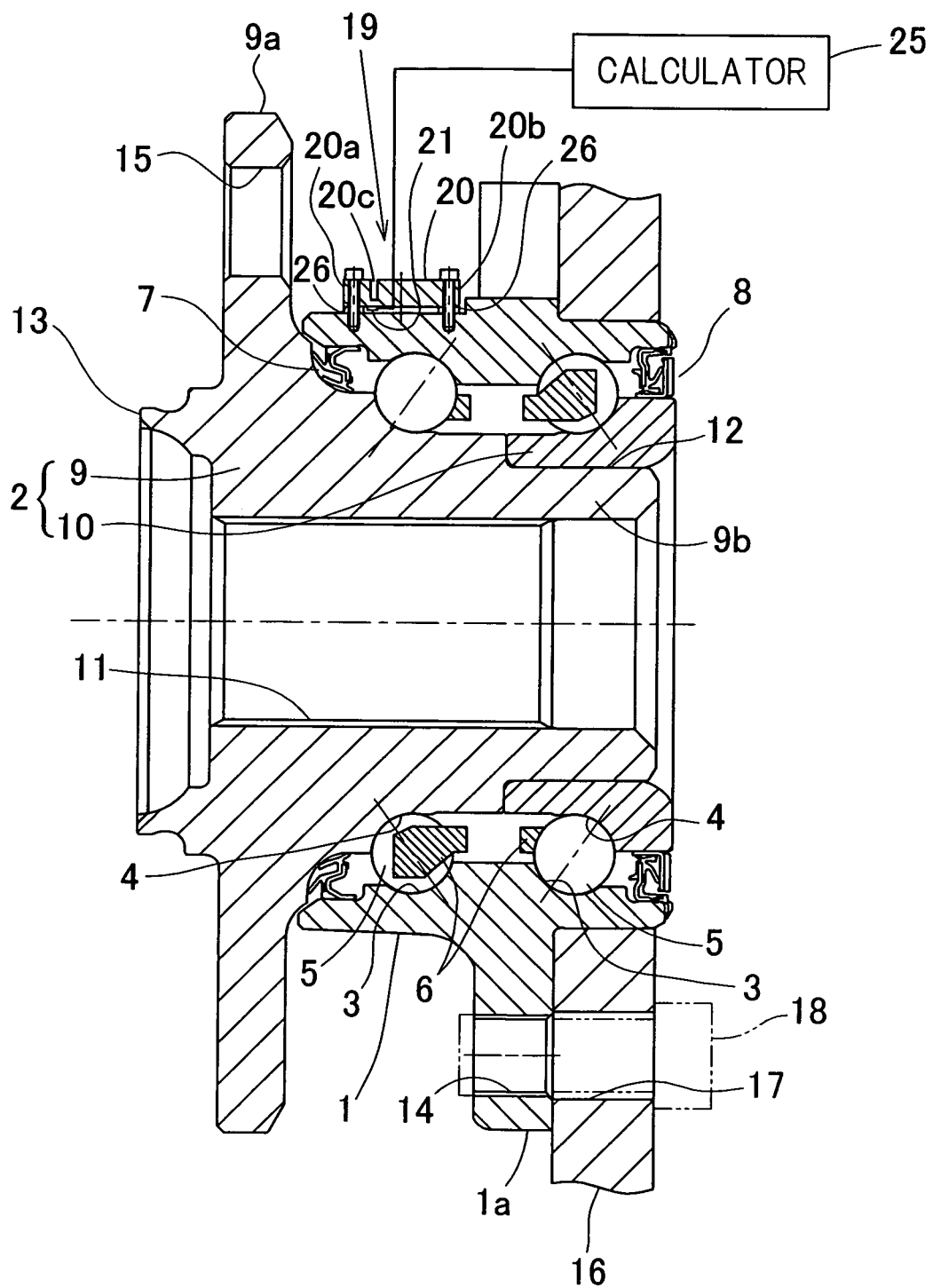
FIG. 14 is a sectional view showing the sensor-equipped wheel support bearing assembly according to a sixth embodiment of the present invention.
Figure 15:
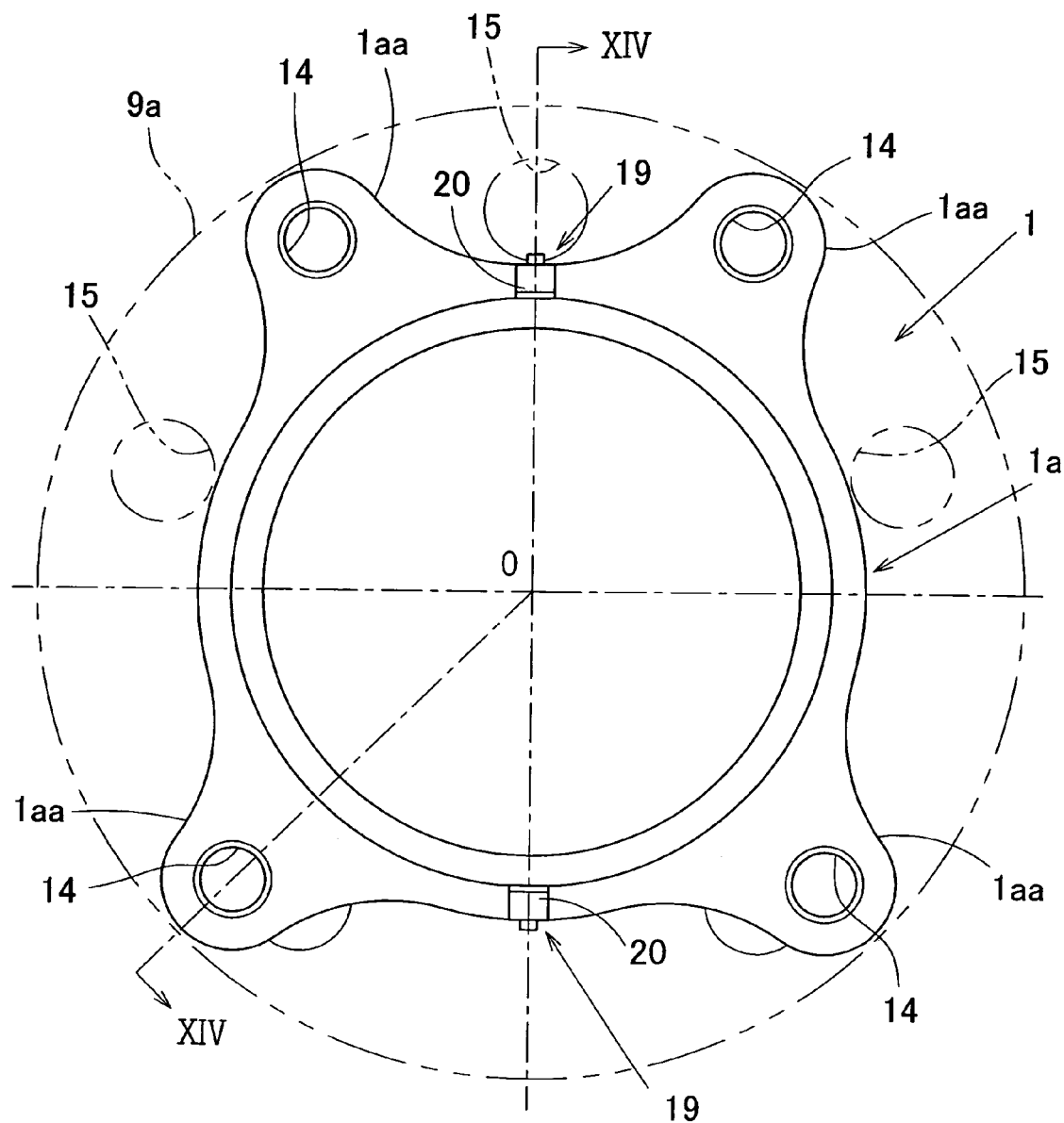
FIG. 15 is a front elevational view showing an outer member forming a part of the sensor-equipped wheel support bearing assembly.
Figure 16:
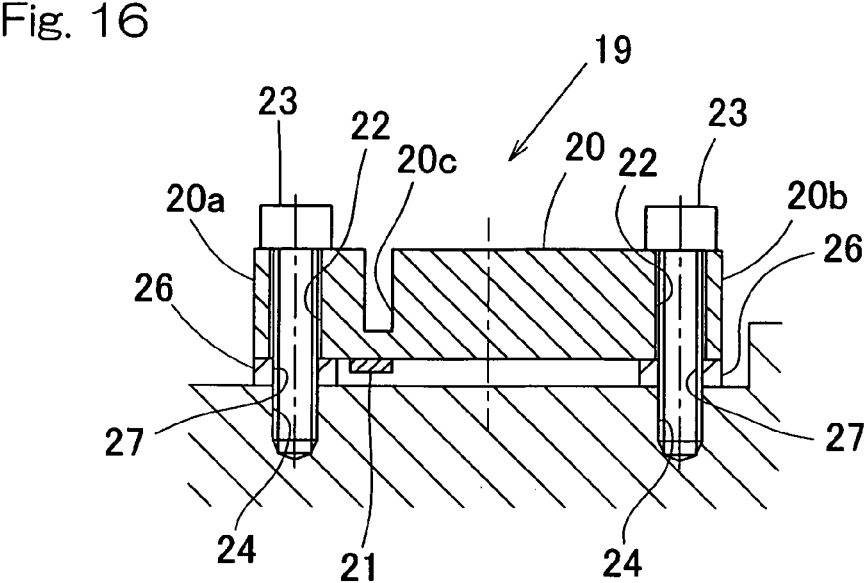
FIG. 16 is an enlarged sectional view showing the sensor unit installation area shown in FIG. 14.
Figure 17A:
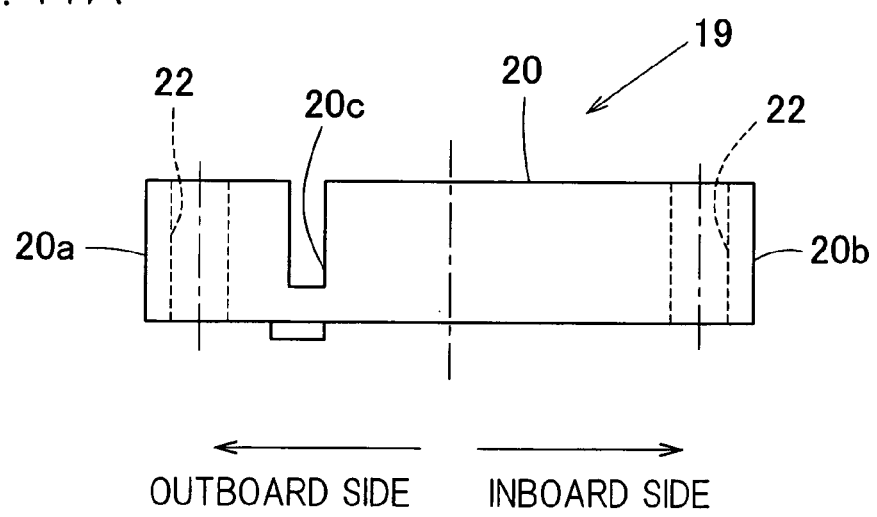
FIG. 17A is a front elevational view showing one constructional example of the sensor unit employed in the sensor-equipped wheel support bearing assembly.
Figure 17B:
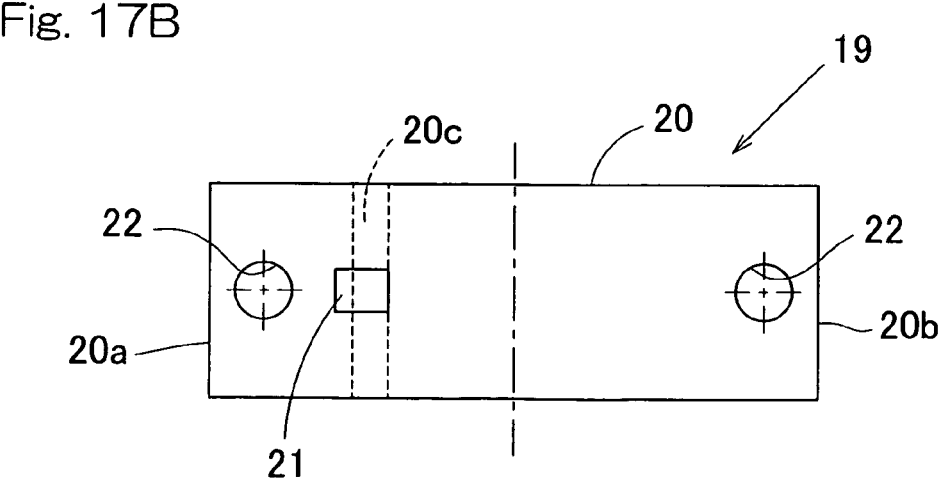
FIG. 17B is a bottom plan view showing the sensor unit.

FIGS. 14 to 17A, 17B illustrate a sixth embodiment of the present invention. It is to be noted that FIG. 15 illustrates a front elevational view of the outer member 1 of the wheel support bearing assembly as viewed from the outboard side and FIG. 14 illustrates a cross sectional view taken along the line XIV-XIV in FIG. 14. This embodiment is such that in the sensor-equipped wheel support bearing assembly according to the embodiment shown in and described with particular reference to FIGS. 10 and 11, as shown in FIG. 16 showing a portion of FIG. 14 on an enlarged scale, the strain generating member 20 of the sensor unit 19 is fixed to the outer diametric surface of the outer member 1 through spacers 26. For this reason, as shown in FIGS. 17A and 17B showing a front elevational view and a bottom plan view, respectively, the inner side surface of the strain generating member 20 including an area of installation of the sensor 21 is formed as in its entirety a flat surface, with the contact fixing segment 20a not protruding towards the inner surface side such as shown and described in connection with the previous embodiment. Other structural features are similar to those shown and described in connection with the previous embodiment.

Because of the foregoing, in a condition in which the strain generating member 20 is bolted to the outer diametric surface of the outer member 1 through the spacers 26 by means of the bolts 23, a portion of the strain generating member 20, other than those portions of the inner side surface of the strain generating member 20 where the spacers 26 are intervened, forms a gap between it and the outer diametric surface of the outer member 1 and, therefore, the sensor 21 as well can be easily installed in proximity to the cutout portion 20c without being interfered with the outer diametric surface of the outer member 1. Also, since the inner side surface of the strain generating member 20 is formed as in its entirety a flat surface, installation of the sensor 21 and processing of the sensor unit 19 can be facilitated. It is to be noted that the bolts 23 are, after having been passed through respective bolt insertion holes 22, defined in the contact fixing segments 20a and 20b so as to extend radially thereof, and then through respective bolt insertion holes 27 defined in the spacers 26, threaded into corresponding bolt holes 24 defined in an outer peripheral portion of the outer member 1.

Further, when the inner side surface of the strain generating member 20 is made flat as hereinabove described, the sensor 21 can easily be formed on the inner side surface of the strain generating member 20 by forming an insulating layer on a portion of the inner side surface, where the sensor is to be mounted, by means of printing and baking and subsequently forming electrodes and a strain measuring resistance element on the resultant insulating layer by means of printing and baking. By forming the sensor 21 in the manner described, lowering of the bonding strength, which would otherwise occur as a result of aging in the case where the sensor 21 is bonded to that sensor mounting surface portion of the strain generating member 20 by the use of a bonding material, may be prevented and the reliability of the sensor unit 19 can be increased. Also, since the processing is easy to achieve, reduction in cost can be expected.

Figure 18:
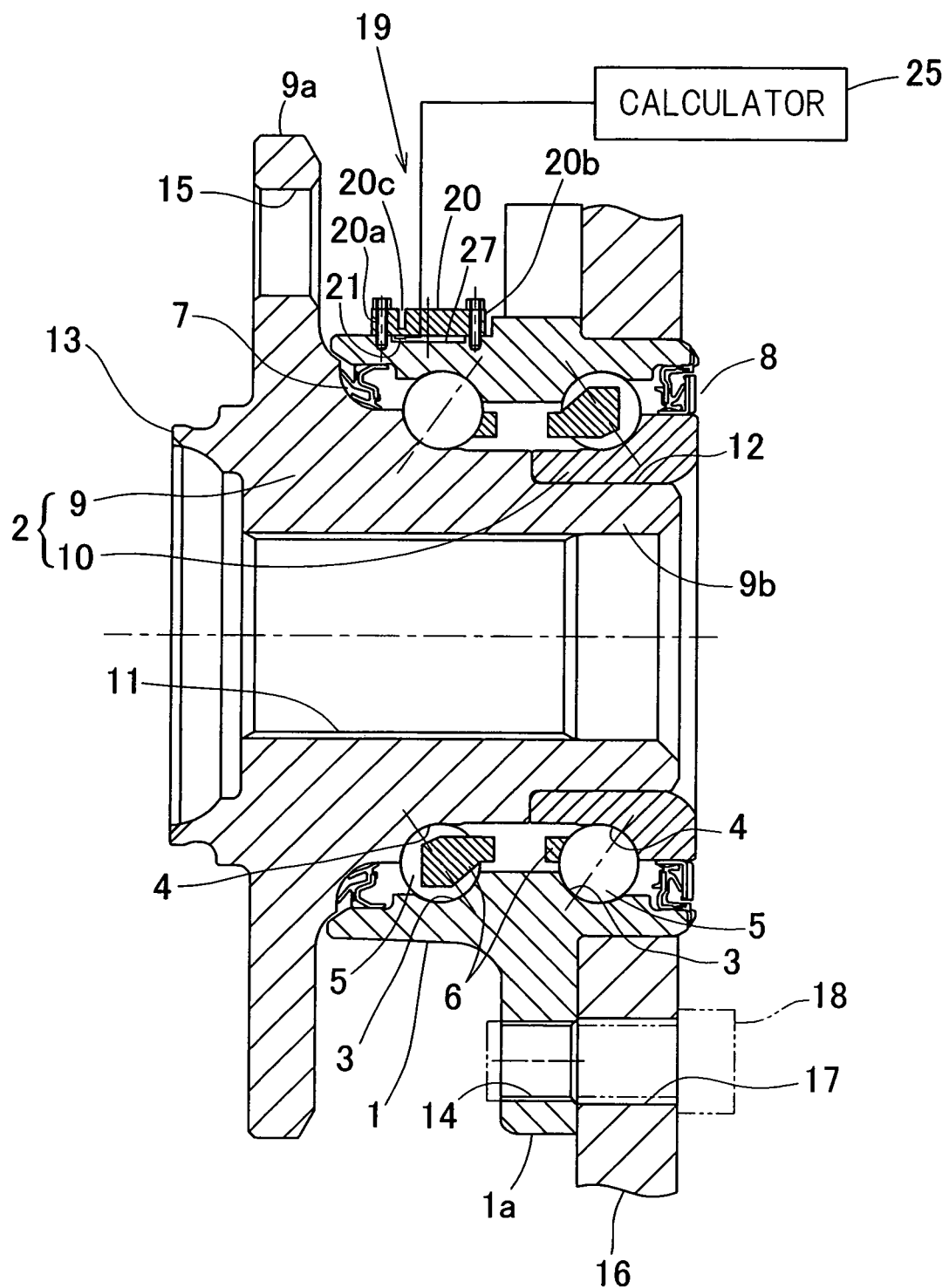
FIG. 18 is a sectional view showing the sensor-equipped wheel support bearing assembly according to a seventh embodiment of the present invention.
Figure 19:
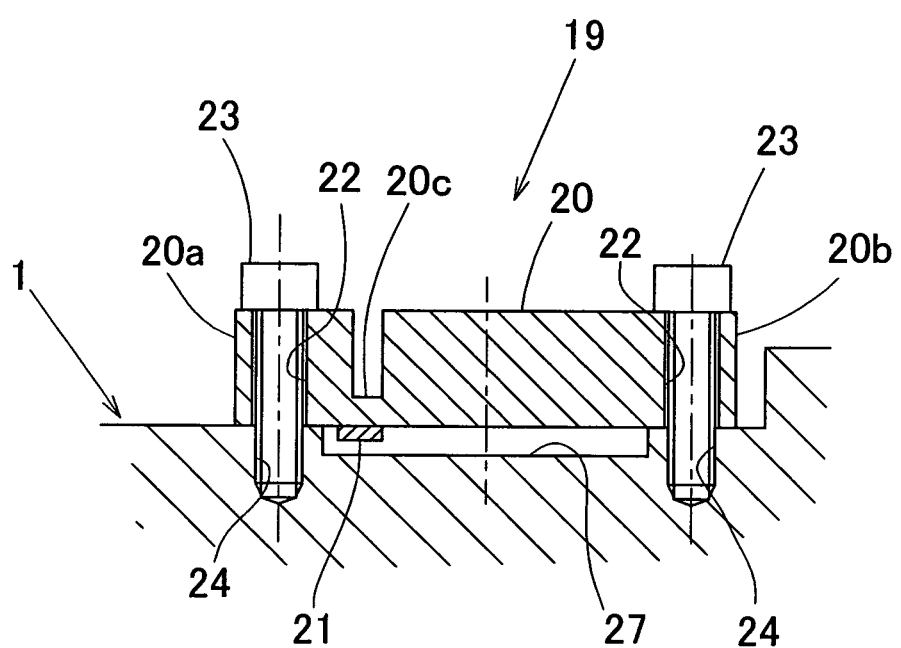
FIG. 19 is an enlarged sectional view showing the sensor unit installation area shown in FIG. 18.

FIGS. 18 and 19 illustrate a seventh embodiment of the present invention. This embodiment is similar to the sensor-equipped wheel support bearing assembly according to the embodiment shown in and described with reference to FIGS. 14 to 17A, 17B, but differs therefrom in that in place of the use of the spacers 26 interposed between the strain generating member 20 of the sensor unit 19 and the outer diametric surface of the outer member 1, a groove 27 is provided at a portion of the outer diametric surface of the outer member 1, which lies between the respective positions at which the two contact fixing segments 20a and 20b are fixed to the outer diametric surface of the outer member 1. Other structural features are similar to those shown and described with reference to FIGS. 14 to 17A, 17B.

When as hereinabove described the groove 27 is provided in the outer diametric surface of the outer member 1, even when the inner side surface of the strain generating member 20 is rendered in its entirety to be flat and the two contact fixing segments 20a and 20b are fixed directly to the outer diametric surface of the outer member 1, a gap is defined between the outer diametric surface of the outer member 1 and the inner side surface of the strain generating member 20 and, therefore, the sensor 21 as well can be easily installed in the vicinity of the cutout portion 20c without being interfered with the outer diametric surface of the outer member 1.

Figure 20:
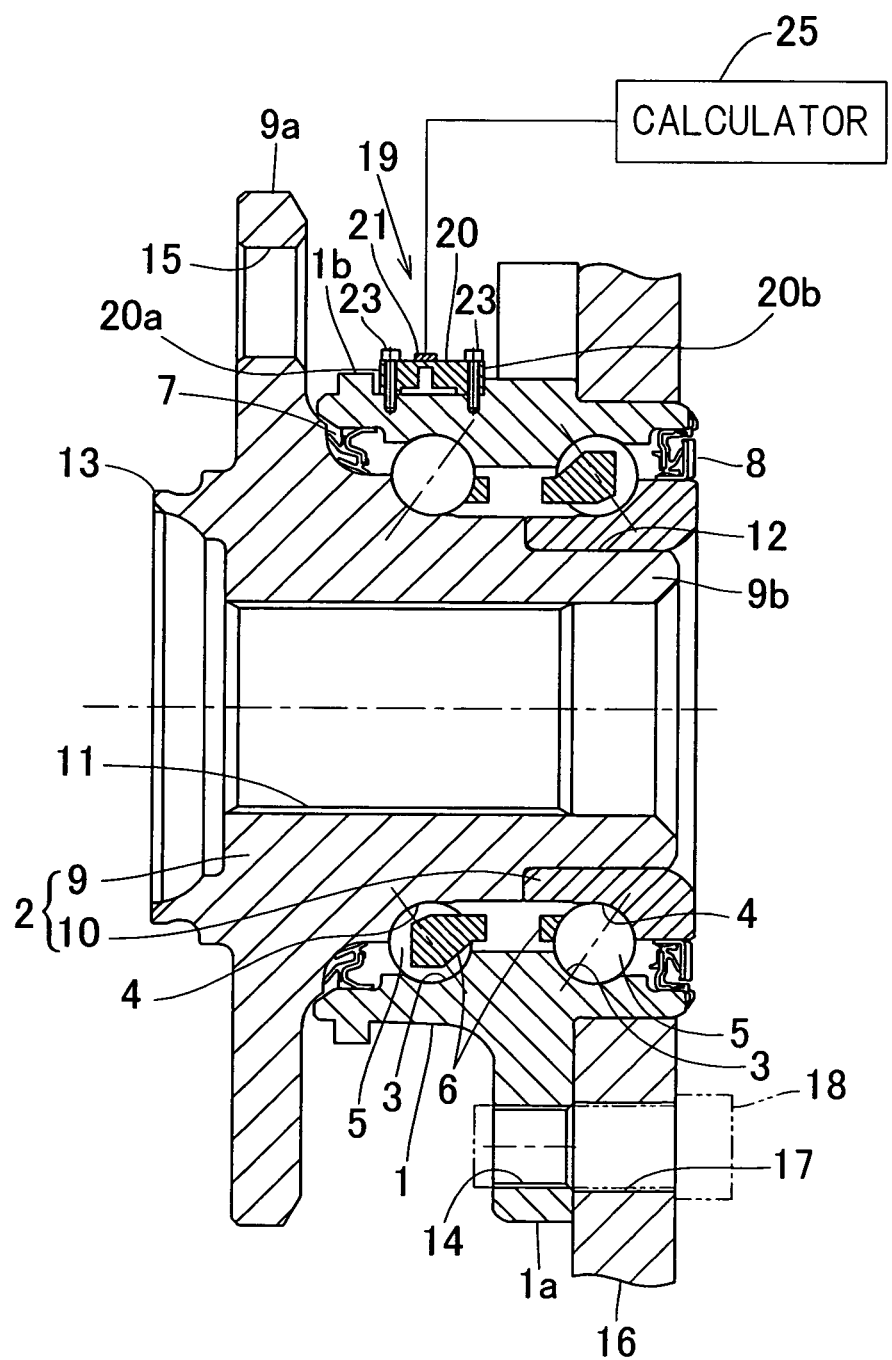
FIG. 20 is a sectional view showing the sensor-equipped wheel support bearing assembly according to an eighth embodiment of the present invention.

Hereinafter, an eighth embodiment of the present invention will be described in detail with particular reference to FIGS. 20 to 22. In those FIGS. 20 to 22, component parts similar to those employed in the previously described first embodiments are designated by like reference numerals employed therein and, therefore, the details thereof are not reiterated for the sake of brevity.

Figure 21:
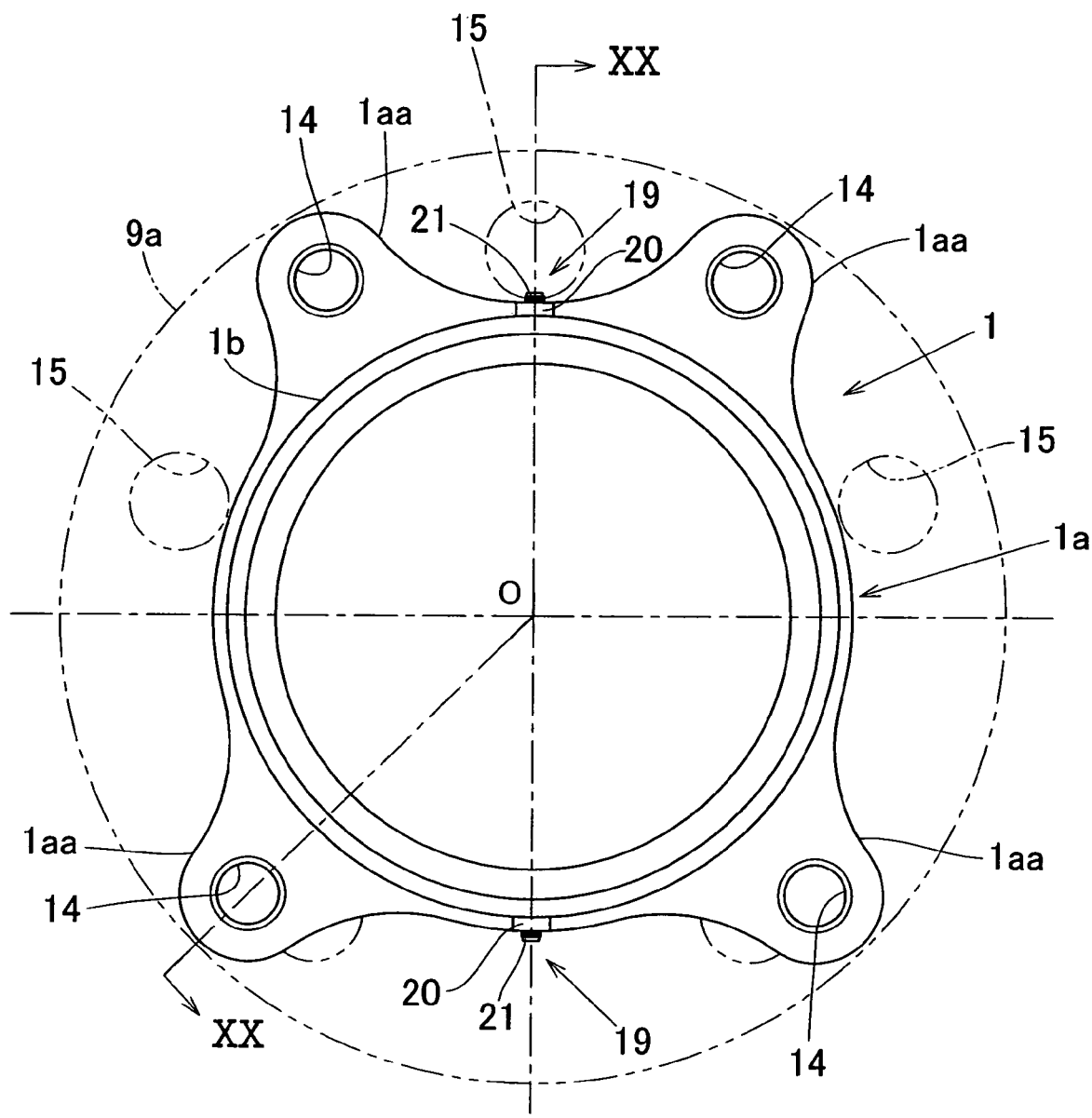
FIG. 21 is a front elevational view showing the outer member forming a part of the sensor-equipped wheel support bearing assembly.

As shown in FIG. 21, in the practice of the eighth embodiment of the present invention, the outer periphery of the outboard end portion of the outer member 1, which is the stationary member, is provided integrally with a thick walled portion 1b over the entire circumference thereof so as to protrude radially outwardly therefrom. This thick walled portion 1b may be formed during, for example, casting and molding of the outer member 1. The outer diametric surface of the outer member 1 is provided with the sensor unit 19. In the instance as shown, two sensor units 19 are, as shown in FIG. 21 in a front elevational view of the outer member 1 as viewed from the outboard side, provided at two locations, that is, the upper surface portion and the lower surface portion of the outer diametric surface of the outer member 1, which defined an upper position relative to the tire tread, so that the load acting on the wheel support bearing assembly in the vertical direction can be detected. More specifically, one of the sensor units 19 is arranged on the upper surface portion of the outer diametric surface of the outer member 1 at a middle portion between the neighboring projecting segments 1aa while the other of the sensor units 19 is arranged at a middle portion between the different neighboring projecting segments 1aa.

Figure 22:
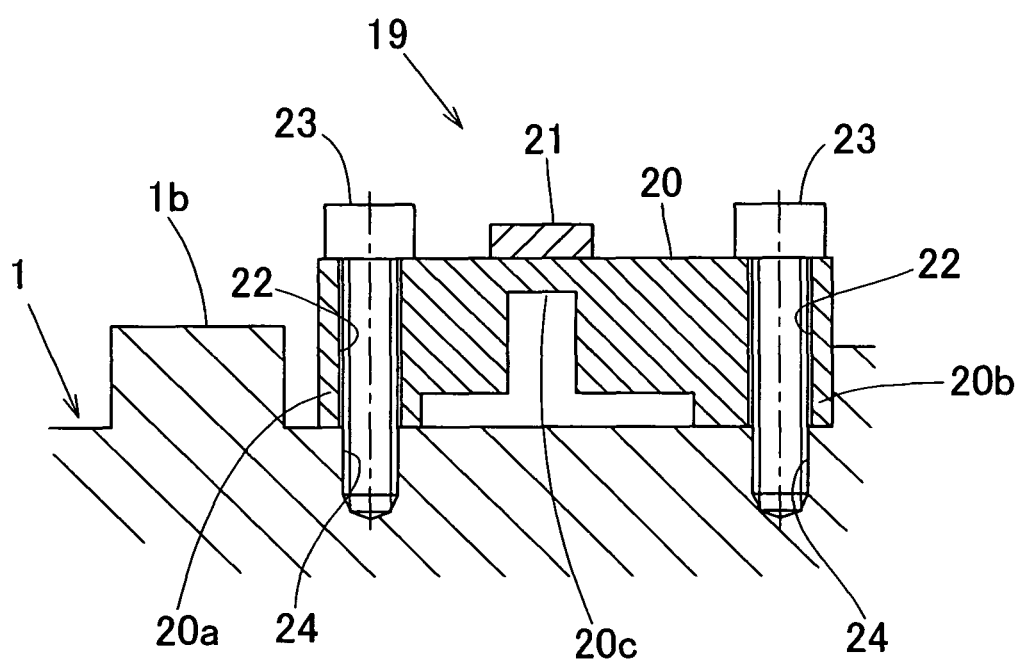
FIG. 22 is an enlarged sectional view showing the sensor unit installation area shown in FIG. 20.

Each of those sensor units 19 includes, as shown in an enlarged sectional view in FIG. 22, a strain generating member 20 and a sensor 21 fitted to this strain generating member 20 and operable to detect a strain induced in the strain generating member 20. The strain generating member 20 is made of a metallic material such as, for example, a steel material. The strain generating member 20 in turn includes two contact fixing segments 20a and 20b positioned at both end portions thereof and protruding inwardly towards an inner surface side confronting the outer diametric surface of the outer member 1 and is fixed directly to the outer diametric surface of the outer member 1 through those contact fixing segments 20a and 20b. Of those two contact fixing segments 20a and 20b, the contact fixing segment 20b is arranged at an axial position where the rolling surface 3 of the outboard side in the outer member 1 is positioned and the other contact fixing segment 20a is arranged at a position on the outboard side from the position of the contact fixing segment 20b and adjacent the thick walled portion 1b, with those two contact fixing segments 20a and 20b being arranged in the same phase relative to each other in a direction circumferentially of the outer member 1. It is to be noted that in order for the sensor unit 19 to be fixed to the outer diametric surface of the outer member 1 in a stabilized fashion, a flat portion is preferably formed at an area of the outer diametric surface of the outer member 1, where the contact fixing segment 20a of the strain generating member 20 is fixed in contact therewith.

Also, a cutout portion 20c is formed in a middle portion of the strain generating member 20 so as to open at an inner surface side thereof The sensor 21 referred to above is pasted to an area of the strain generating member 20, where the strain occurs considerably relative to the load acting in various directions. In the instance as shown, for that area, an area of the strain generating member 20 proximate to the cutout portion 20c, more specifically an area on an outer surface side of the strain generating member 20 and on a rear side of the cutout portion 20c is selected so that the sensor 21 can detect the strain occurring around the cutout portion 20c.

In the instance now under discussion, since a portion of the outer periphery of the outer member 1 is formed with a thick walled portion 1b over the entire circumference thereof, the rigidity at that portion is increased and it forms a site where the amount of deformation is small enough to minimize the influence brought about by the hysteresis. On the other hand, a circumference of the rolling surface 3 in the outer member 1 is a site, where the tire working force is transmitted through the rolling element, and, therefore, it forms an area at which the amount of deformation is relatively large.

Also, since one contact fixing segment 20a of the contact fixing segments of the sensor unit 19 is fixed to a portion of the outer diametric surface of the outer member 1 adjacent the thick walled portion 1b and the other contact fixing segment 20b of the contact fixing segments is fixed to a portion of the outer diametric surface of the outer member 1 at the axial position where the rolling surface 3 of the outboard row is positioned, the strain induced in the outer diametric surface of the outer member 1 can be amplified and then transmitted to the strain generating member 20 and this amplified strain is subsequently detected by the sensor 21. Since the calculator 25 calculates the working force, developed between the tire of the vehicle wheel and the road surface, from the output signal of this sensor 21, the working force developed between the tire of the vehicle wheel and the road surface can be detected with high sensitivity even when the automotive vehicle is held halted or it is driven at a low speed. Since as hereinbefore described, the sensor unit 19 is not secured to any projecting segment 1aa of the vehicle body fitting flange 1a, which would constitute a cause of the hysteresis, the hysteresis occurring in the output signal of the sensor 21 can be reduced and, therefore, the load can be calculated accurately.

Since in the eighth embodiment described hereinabove, the thick walled portion 1b in the outer periphery of the outer member 1 is provided on an outboard side remote from the projecting segments 1aa of the vehicle body fitting flange 1a tending to be affected by friction, the hysteresis appearing in the output signal of the sensor 21 can be further reduced, allowing the load to be further accurately calculated. Also, since the outboard side of the outer member 1 has relatively sufficient space, the thick walled portion 1b can be easily provided.

Also, since in the eighth embodiment described hereinabove, of the two contact fixing segments 20a and 20b of the strain generating member 20 in the sensor unit 19, the contact fixing segment 20b is arranged at the axial position on the outer diametric surface of the outer member 1, which corresponds to the axial position of the rolling surface 3 is positioned, such sensor unit 19 is installed at that portion where the load acting on the tire tread can be transmitted from the inner member 2 through the rolling elements 5 and the amount of deformation is relatively large. For this reason, the strain tends to be concentrated on the strain generating member 20 and, correspondingly, the sensitivity can be increased, allowing the load to be further accurately calculated.

Also, although the amount of deformation induced in the outer member 1 as a result of application of the load thereto varies depending on the axial position, since the two contact fixing segments 20a and 20b of the strain generating member 20 in the sensor unit 19 in this embodiment are held and fixed at the same phase in the direction circumferentially thereof, the strain tends to be concentrated on the strain generating member 20 and the detecting sensitivity is correspondingly increased. Such an arrangement of the contact fixing segments 20a and 20b as described above becomes effective particularly where the structure, in which the thick walled portion 1b is provided in the outboard side of the outer member 1, is employed.

Also, in place of the sensor unit 19, the use may be made of a displacement sensor or an ultrasonic sensor to measure a relative displacement of one position and a different position to thereby detect the amount of deformation. By way of example, the displacement sensor may be provided in the thick walled portion 1b to measure the amount of displacement of the outer diametric surface of the outer member 1 around the rolling elements 5. In such case, as for the reduction in hysteresis appearing in the output signal, an effect similar to that afforded by this embodiment utilizing the sensor unit 19 can be obtained.

Figure 23:
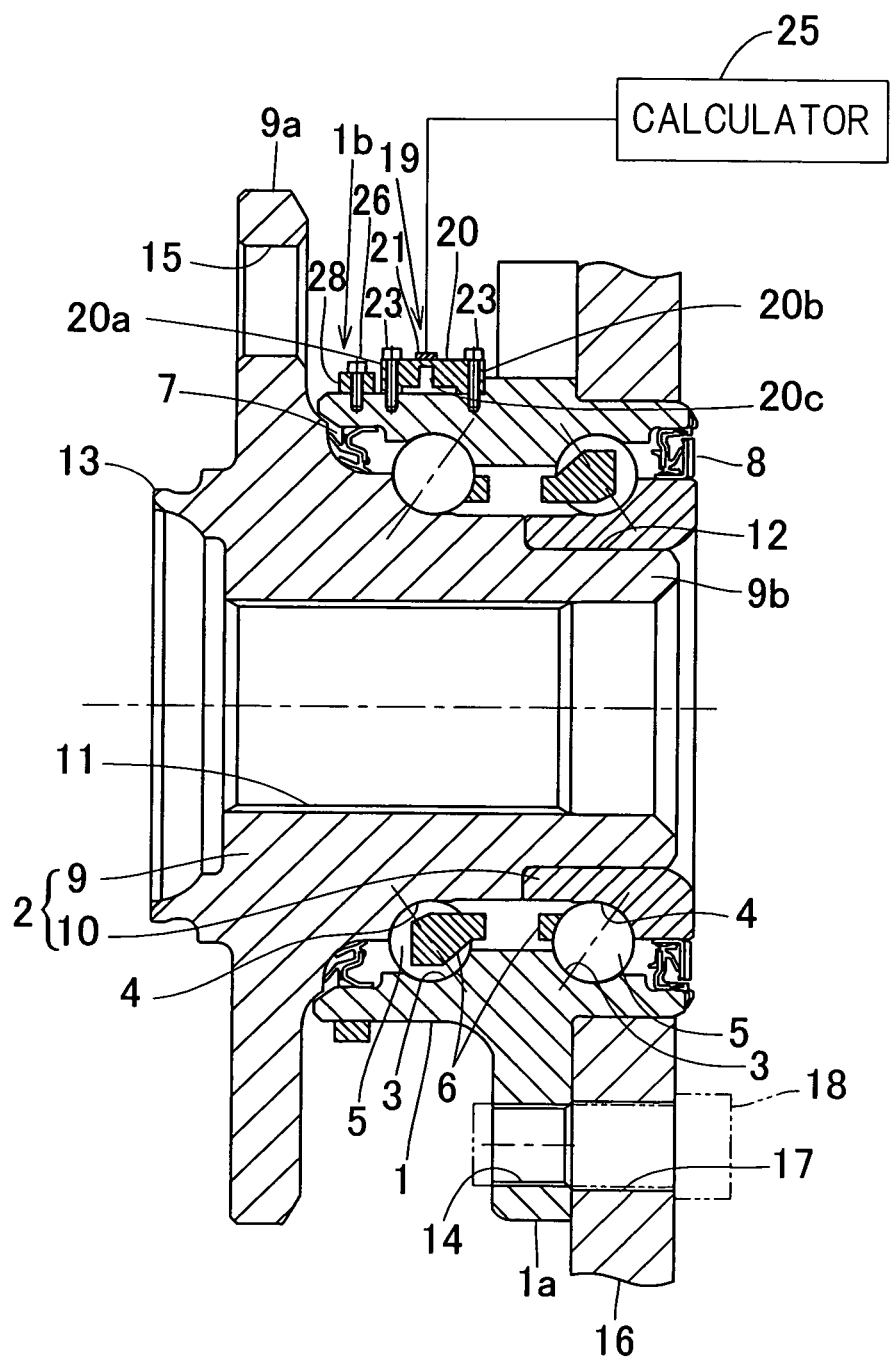
FIG. 23 is a sectional view showing the sensor-equipped wheel support bearing assembly according to a ninth embodiment of the present invention.

FIG. 23 illustrates a ninth embodiment of the present invention, the sensor-equipped wheel support bearing assembly according to the ninth embodiment is similar to that shown in and described with reference to FIGS. 20 to 22 in connection with the eighth embodiment, but differs therefrom in that for the thick walled portion 1b of the outer periphery of the outer member 1, a ring shaped member 28 is mounted on the outer diametric surface of the outer member 1 from the outboard side and is then firmly secured to the outer diametric surface of the outer member 1 by the use of a bolt 26. Fixing of the ring shaped member 28 may alternatively be accomplished by means of any other method than the use of the bolt 26 such as, for example, welding, press-fitting or bonding. Other structural features are similar to those shown in and described with reference to FIGS. 20 to 22 in connection with the eighth embodiment of the present invention.

When as hereinabove described the ring shaped member 28 separate from the outer member 1 is fixed on the outer diametric surface of the outer member 1 to define the thick walled portion 1b, forging and molding of the outer member 1 can be facilitated since no projection exist on the outer diametric surface of the outer member 1.

Figure 24:
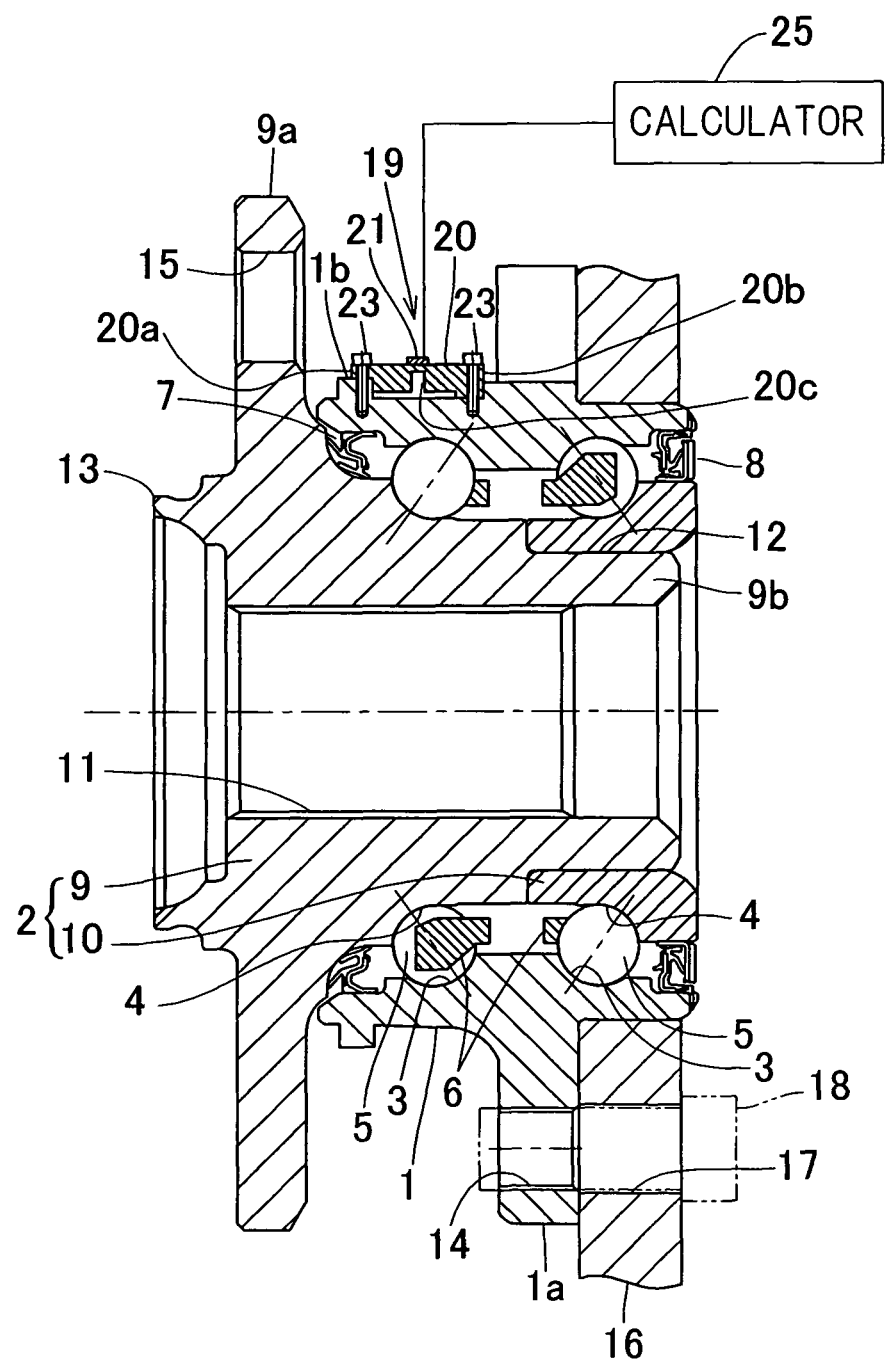
FIG. 24 is a sectional view showing the sensor-equipped wheel support bearing assembly according to a tenth embodiment of the present invention.

FIG. 24 illustrates a tenth embodiment of the present invention. The sensor-equipped wheel support bearing assembly according to this tenth embodiment is similar to that shown in and described with reference to FIGS. 20 to 22 in connection with the eighth embodiment, but differs therefrom in that one contact fixing segment 20a of the contact fixing segments of the strain generating member 20 in the sensor unit 19 is fixed directly to the thick walled portion 1b of the outer diametric surface of the outer member 1 by means of the bolts 23, in place of being fixed in the vicinity of the thick walled portion thereof. Other structural features are similar to those shown in and described with reference to FIGS. 20 to 22 in connection with the eighth embodiment of the present invention.

When as hereinabove described one contact fixing segment 20a of the contact fixing segments of the strain generating member 20 in the sensor unit 19 is fixed to the thick walled portion 1b, at which the amount of deformation is small, while the other contact fixing segment 20b of the contact fixing segments thereof is fixed to the area at which the amount of deformation is relatively large, the strain tends to be concentrated on the strain generating member 20 and the detecting sensitivity of the sensor 21 can be increased, allowing the load to be further accurately calculated.

Figure 25:
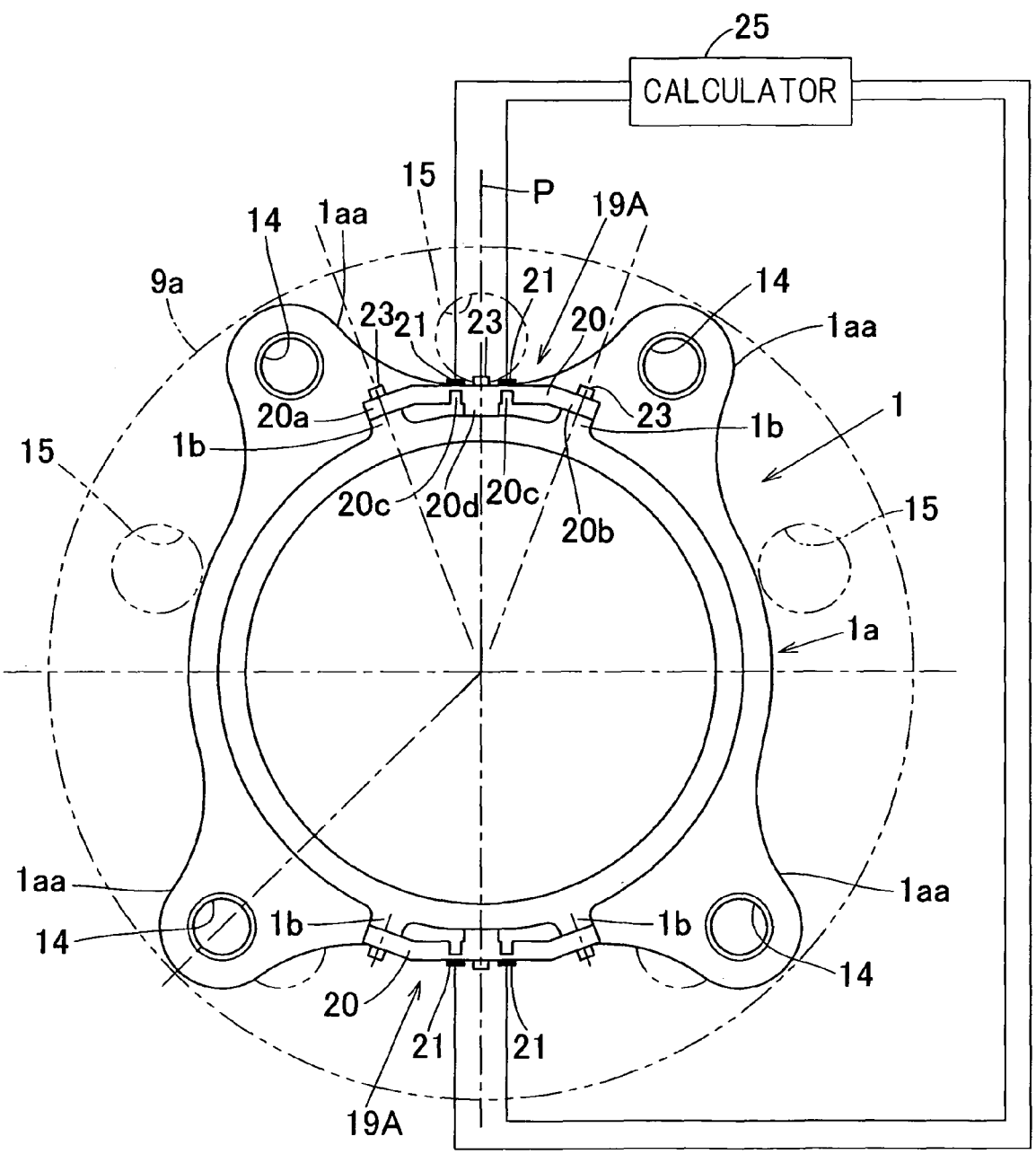
FIG. 25 is a front elevational view showing the outer member forming a part of the sensor-equipped wheel support bearing assembly according to an example of application of the present invention.
Figure 26:
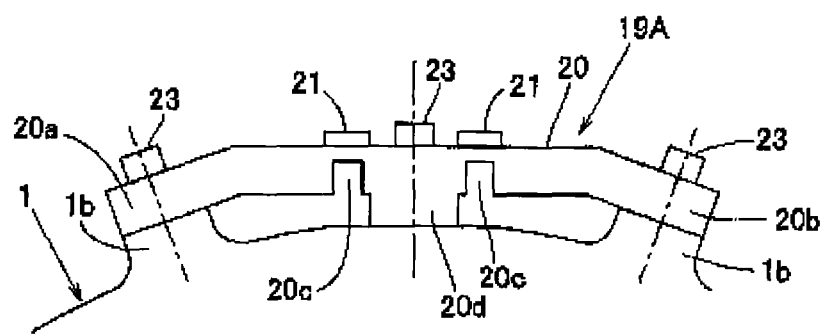
FIG. 26 is an enlarged view showing the sensor unit installation area in the outer member.
Figure 27:
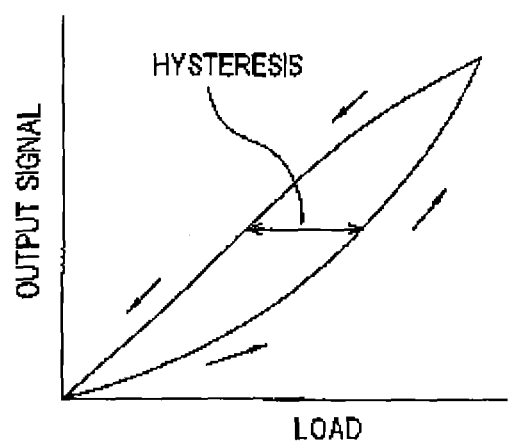
FIG. 27 is an explanatory diagram showing the hysteresis appearing in the output signal according to the conventional counterpart.

FIGS. 25 and 26 illustrate an example of application that is not encompassed within the present invention. In the sensor-equipped wheel support bearing assembly according to this example of application, as shown in FIG. 25 showing the outer member 1 as viewed from the outboard side, at upper and lower surface positions on the outer diametric surface of the outer member 1, an axially extending thick walled portion 1b is integrally provided at four locations distributed a predetermined angle in the circumferential direction relative to a vertical axis P extending in a vertical direction of the outer member 1. Also, in this example of application, a sensor unit 19A is made up of a strain generating member 20, including three contact fixing segments 20a, 20b and 20d and two cutout portions 20c, and two sensors 21, and is provided each at upper and lower surface positions on the outer diametric surface of the outer member 1. The three contact fixing segments 20a, 20b and 20d in each of the sensors 21 are fixed at the same axial positions of the outer diametric surface of the outer member 1.

For example, in the sensor unit 19A provided at the upper surface position on the outer diametric surface of the outer member 1, as shown in FIG. 26 on an enlarged scale, the strain generating member 20 is arranged so as to straddle a pair of the left and right thick walled portions 1b, with its opposite end portions and intermediate portion rendered to be the contact fixing segments 20a, 20b and 20d, respectively. The contact fixing segments 20a and 20b at the opposite end portions of the strain generating member 20 are placed on the left and right thick walled portions 1b and fixed to the thick walled portions 1b by means of bolts 23. The contact fixing segment 20a at the intermediate portion of the strain generating member 20 is formed to protrude towards an inner surface side so as to contact the outer diametric surface of the outer member 1 and fixed to the outer diametric surface of the outer member 1 by means of a bolt 23. The strain generating member 20 has the inner surface side formed with cutout portions 20c at respective locations somewhat distant from the contact fixing segment 20d at the intermediate portion towards the associated end portions of the strain generating member 20. The strain generating member 20 also has an outer surface side to which the two sensors 21 are pasted and positioned at respective locations on a rear side of the associated cutout portions 20c. The sensor unit 19A provided at the lower surface position on the outer diametric surface of the outer member 1 is configured and arranged in a manner similar to each of the sensor units 19A disposed at the upper surface position as described hereinabove and, therefore, the details thereof are not reiterated. The sensors 21 in each of the sensor units 19A are connected with a single calculator 25. Even in this example of application, if the contact fixing segment 20a of the strain generating member 20 is arranged at an axial location where the rolling surface 3 is positioned, it may occur, in a manner similar to that occurring with the eighth embodiment shown in and described with reference to FIGS. 20 to 22, that a change will appear in the output signal of the sensor 21 as the rolling elements 5 move past a site of the rolling surface 3 proximate to the sensor unit 19A. Other structural features are similar to those employed in the eighth embodiment shown in and described with particular reference to FIGS. 20 to 22.

It is to be noted that, in each of the foregoing embodiments of the present invention and the example application, the following structural parameters are not specifically limited and may be changed, modified or altered.

The number of the sensor units 19 employed, locations where the sensor units 19 are disposed, the number of the contact fixing segments 20a, the number of the sensors 21 and the number of the cutout portions 20c.

The number of the thick walled portions 1b employed, locations where the thick walled portions 1b are formed, the method of forming the thick walled portions (which may not be formed during forging, but may be formed by means of machining).

The shape and the manner of fixing the sensor units 19 (e.g., bonding or welding)

Each of the various embodiments or example of application shown and described with reference to FIGS. 20 to 26 may include the following applied modes which do not employ a limitation of the present invention, i.e., the feature in which the two contact fixing segments are arranged at the same phase in the circumferential direction.

[Applied Mode 1]

The sensor-equipped wheel support bearing assembly according to the applied mode 1 is a wheel support bearing assembly for rotatably supporting a vehicle wheel relative to a vehicle body structure and including an outer member having an inner periphery formed with a plurality of rows of rolling surfaces, an inner member having an outer periphery formed with rolling surfaces opposed to the above described rolling surfaces, and a plurality of rows of rolling elements interposed between the opposed rolling surfaces in both members, in which a portion of a stationary member of the outer member and the inner member is provided with a thick walled portion which is a portion having its wall locally thickened and in which a sensor unit including a strain generating member, having two or more contact fixing segments, and a sensor fitted to the strain generating member for detecting a strain induced in this strain generating member is fixed to an outer diametric surface of the stationary member through the contact fixing segments. For the sensor for detecting the strain, a strain gauge for detecting the strain directly, for example, may be employed, but other than it, a sensor for detecting the strain indirectly, for example, a displacement sensor or an ultrasonic sensor may be employed to detect the strain through a displacement detection.

When a load acts between the tire of the vehicle wheel and the road surface, deformation occurs in the stationary member (for example, the outer member) of the wheel support bearing assembly as a result of application of the load thereto. If the sensor unit is fixed to, for example, the vehicle body fitting flange and an attempt is made to calculate the load from the deformation of the flange, a hysteresis occurs in an output signal. Particularly where the strain occurring in the stationary member is desired to be detected in the form as amplified from the strain generating member of the sensor unit, the output signal is aversely affected by influences brought about by the hysteresis. However, in this applied mode 1, the thick walled portion is provided in part of the outer periphery of the outer member, the thick walled portion has an increased rigidity, the amount of deformation is small and, hence, the thick walled portion represents the site at which influences of the hysteresis are minimal. Because of the thick walled portion so formed, the site at which the amount of deformation is small and the influences brought about by the hysteresis is minimal can be provided at a location separate from the vehicle body fitting flange. In view of this, where the sensor unit is to be fixed to the outer diametric surface of the outer member, one of the contact fixing segments of the strain generating member is fixed to a location proximate to, for example, the thick walled portion and another one of the contact fixing segments is fixed to a location where the amount of deformation is relatively large, for example, a circumferential portion of the rolling surface in the outer member. By so doing, the strain induced in the outer diametric surface of the outer member is, after having been amplified, transmitted to the strain generating member and the amplified strain is thus detected by the sensor. For this reason, the working force developed between the tire of the vehicle wheel and the road surface can be detected with a high sensitivity, and the hysteresis occurring in the output signal of the sensor can be reduced. As a result, without being affected by the hysteresis, the load imposed on the vehicle wheel can be detected with a high accuracy.

[Applied Mode 2]

In the applied mode 1 described above, the stationary member may be an outer member. If the stationary member is the outer member, as compared with the case in which the stationary member is the inner member, the strain can be detected with a high accuracy and an effect of reducing the hysteresis due to formation of the thick walled portion can be obtained easily.

[Applied Mode 3]

In the applied mode 1 described above, the thick walled portion may be provided in the outer periphery of an outboard end of the stationary member.

When the provision of the thick walled portion is provided in the outer periphery of the outboard end, such thick walled portion is provided at a location distant from the vehicle body fitting flange tending to be affected by a slippage in the event of excess over the stationary frictional force. For this reason, the hysteresis appearing in the output signal of the sensor can be further reduced and the load can be further accurately detected. Also, where the stationary member is the outer member, the thick walled portion can be easily provided since a relatively ample space is available at the outer periphery on the outboard side thereof.

[Applied Mode 4]

In the applied mode 1 described above, the thick walled portion may be a ring shaped member employed to the stationary member as a member separate from the stationary member and fixed to the stationary member. Where the thick walled portion is formed by the use of the ring shaped member that is a member separate from the stationary member, there is no projection in the stationary member and, therefore, forging of the stationary member can be facilitated.

[Applied Mode 5]

In the applied mode 1 described above, at least one of the contact fixing segments may be arranged at an axial location where the rolling surface is positioned. The axial location where the rolling surface is positioned is a portion where the amount of deformation is relatively large. Because the sensor unit is installed at that portion where the amount of deformation is large, the strain tends to be concentrated on the strain generating member and the sensitivity can be increased correspondingly and the load can be accurately detected. It is to be noted that although at the axial location where the rolling surface is positioned an output change may occur depending on the presence or absence of the rolling elements then revolving, the load can be calculated from the average value or the amplitude of waveforms and, therefore, the speed of movement of the rolling elements, that is, the number of revolutions can be calculated from the output signal.

[Applied Mode 6]

In the applied mode 1 described above, one of the contact fixing segments of the sensor unit may be fixed to the thick walled portion. The thick walled portion is that portion where the amount of deformation is small, and if one of the contact fixing segments is fixed to that portion and another one of the contact fixing segments is fixed to a portion where the amount of deformation is relatively large, the strain tends to be concentrated on the strain generating member and the detecting sensitivity of the sensor is increased, allowing the load to be further accurately detected.

[Applied Mode 7]

In the applied mode 1 described above, the strain generating member of the sensor unit may include a cutout portion and the sensor may be provided around the cutout portion. If the strain generating member is formed with the cutout portion, the strain amplified and transmitted from the stationary member to the strain generating member can be easily concentrated on the cutout portion. For this reason, the detecting sensitivity of the sensor can be further increased, allowing the load to be further accurately detected.

[Applied Mode 8]

In the applied mode 1 described above, a vehicle body fitting flange, which is adapted to be coupled to a knuckle, may be provided on an outer periphery of the stationary member, bolt holes may be provided in this vehicle body fitting flange at a plurality of locations circumferentially of this flange, circumferential portions of the flange, where the bolt holes are provided, may be rendered to be projecting segments protruding radially beyond the remaining portion thereof, and the sensor unit may be arranged at a location middle portion between the neighboring projecting segments. If the sensor unit is arranged middle portion between the projecting segments, the sensor unit is after all provided at a position distant from the projecting segments which form a cause of the hysteresis. For this reason, the hysteresis of the output signal of the sensor can be further reduced, allowing the load to be further accurately detected.

[Applied Mode 9]

In the applied mode 1 described above, one of the sensor units may be provided in an upper surface portion of the outer diametric surface of the outer member relative to the tire tread.

Even when the load Fz acting in the vertical direction or the load Fy acting in the transverse direction is applied, the upper surface portion of the outer diametric surface of the outer member is where the load of the rolling elements is applied at all time and, therefore, the load can be accurately detected in any event.

[Applied Mode 10]

In the applied mode 1 described above, the sensor unit referred to above may be of a type capable of detecting a load Fz acting on the wheel support bearing assembly in the vertical direction.

Since the sensor unit is used for detecting even the slightest strain that has been amplified, even the load Fz acting in the vertical direction, in which the amount of deformation of the stationary member is small, can be detected accurately.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor-equipped wheel support bearing assembly for rotatably supporting a vehicle wheel relative to a vehicle body structure, comprising:
   an outer member having an inner periphery formed with a plurality of rows of rolling surfaces;
   an inner member having an outer periphery formed with rolling surfaces opposed respectively to the rolling surfaces of the outer member;
   a plurality of rows of rolling elements interposed between the opposed rolling surfaces in the inner member and the outer member; and
   a sensor unit, provided on an outer diametric surface of the outer member, the sensor unit including a strain generating member having two contact fixing segments secured to the outer diametric surface of the outer member in contact therewith, and a sensor fitted to the strain generating member for detecting a strain occurring in the strain generating member,
   wherein the two contact fixing segments in the sensor unit are arranged along an axial direction of the outer member,
   the strain generating member in the sensor unit has a cutout portion and the sensor is provided in the proximity of this cutout portion,
   the strain generating member has a surface portion, positioned on a radially outer side of one of the contact fixing segments that is positioned on an outboard side, configured to have a shape effective to avoid interference with hub bolts, and
   an outboard corner portion of the surface portion of the strain generating member is chamfered to provide a chamfered corner portion of a shape effective to avoid interference with the hub bolts.

2. The sensor-equipped wheel support bearing assembly as claimed in claim 1, wherein a first one of the two contact fixing segments is arranged at an axial position that corresponds to a circumference of an outboard rolling surface of the plural rows of the rolling surfaces and a second one of the two contact fixing segments is arranged further outboard from the first one of the two contact fixing segments.

3. The sensor-equipped wheel support bearing assembly as claimed in claim 1, wherein the cutout portion in the sensor unit is arranged on an outboard side relative to the vehicle body structure and remote from a middle portion between the two contact fixing segments.

4. The sensor-equipped wheel support bearing assembly as claimed in claim 3, wherein the cutout portion in the sensor unit is cut out from an outer surface side of the strain generating member towards an inner surface side thereof.

5. The sensor-equipped wheel support bearing assembly as claimed in claim 3, wherein a predetermined surface portion that contains a sensor installing surface in the strain generating member is formed as a flat plane.

6. The sensor-equipped wheel support bearing assembly as claimed in claim 5, wherein the strain generating member of the sensor unit is fixed to the outer diametric surface of the outer member through a spacer.

7. The sensor-equipped wheel support bearing assembly as claimed in claim 5, wherein a groove is provided between positions on the outer diametric surface of the outer member where the two contact fixing segments of the sensor unit are fixed.

8. The sensor-equipped wheel support bearing assembly as claimed in claim 1, further comprising a vehicle body fitting flange, adapted to be coupled to a knuckle, provided on the outer diametric surface of the outer member, the flange having bolt holes formed at a plurality of locations circumferentially on the flange,
   wherein circumferential portions of the flange, where the bolt holes are provided, are rendered to be projecting segments protruding radially beyond the remaining portion of the flange, and the sensor unit is arranged at a middle portion between neighboring projecting segments.

9. The sensor-equipped wheel support bearing assembly as claimed in claim 1, wherein the outer member has a portion thereof provided with a thick walled portion that is thicker than an adjacent wall portion.

10. The sensor-equipped wheel support bearing assembly as claimed in claim 9, wherein the thick walled portion is provided in a portion of the outer diametric surface of the outer member in an outboard end portion thereof.

11. The sensor-equipped wheel support bearing assembly as claimed in claim 1, further comprising a calculator to calculate a load acting on the wheel support bearing assembly in reference to at least one of an absolute value of an output signal of the sensor, an average value of the output signal and an amplitude of the output signal.

12. A sensor-equipped wheel support bearing assembly for rotatably supporting a vehicle wheel relative to a vehicle body structure, comprising:
   an outer member having an inner periphery formed with a plurality of rows of rolling surfaces;
   an inner member having an outer periphery formed with rolling surfaces opposed respectively to the rolling surfaces of the outer member;
   a plurality of rows of rolling elements interposed between the opposed rolling surfaces in the inner member and the outer member; and
   a sensor unit, provided on an outer diametric surface of the outer member, the sensor unit including a strain generating member having two contact fixing segments secured to the outer diametric surface of the outer member in contact therewith, and a sensor fitted to the strain generating member for detecting a strain occurring in the strain generating member,
   wherein the two contact fixing segments in the sensor unit are arranged along an axial direction of the outer member, the strain generating member in the sensor unit has a cutout portion and the sensor is provided in the proximity of this cutout portion, the strain generating member has a surface portion, positioned on a radially outer side of one of the contact fixing segments that is positioned on an outboard side, configured to have a shape effective to avoid interference with hub bolts, and an outboard corner portion of the surface portion of the strain generating member has a height protruding from the outer diametric surface of the outer member, which is smaller than a height of the contact fixing segment on an inboard side relative to the vehicle body structure, so that that the surface portion has a shape effective to avoid interference with the hub bolts.

* * * * *